United States Patent
Yamamoto et al.

(10) Patent No.: US 8,617,340 B2
(45) Date of Patent: Dec. 31, 2013

(54) BONDING METHOD AND BONDED BODY

(75) Inventors: Takatoshi Yamamoto, Suwa (JP); Mitsuru Sato, Suwa (JP); Shintaro Asuke, Suwa (JP); Yoshiaki Mori, Suwa (JP); Kazuhiro Gomi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 1078 days.

(21) Appl. No.: 12/323,946

(22) Filed: Nov. 26, 2008

(65) Prior Publication Data
US 2009/0136767 A1 May 28, 2009

(30) Foreign Application Priority Data
Nov. 28, 2007 (JP) ................. 2007-307620

(51) Int. Cl.
B32B 38/00 (2006.01)

(52) U.S. Cl.
USPC ...................................... 156/275.5

(58) Field of Classification Search
USPC .......... 156/272.2, 275.1, 275.3, 275.5, 275.7, 156/292, 272.6
See application file for complete search history.

(56) References Cited

U.S. PATENT DOCUMENTS

| | | | |
|---|---|---|---|
| 4,392,907 A * | 7/1983 | Shirato et al. ................. | 156/252 |
| 5,439,554 A | 8/1995 | Tamura et al. | |
| 5,498,306 A * | 3/1996 | Shibata et al. ............. | 156/275.3 |
| 5,753,720 A | 5/1998 | Nakanishi et al. | |
| 5,982,041 A | 11/1999 | Mitani et al. | |
| 6,057,405 A | 5/2000 | Wengrovius et al. | |
| 6,211,322 B1 | 4/2001 | Dohler et al. | |
| 6,410,642 B1 | 6/2002 | Yamakawa et al. | |
| 6,720,083 B2 | 4/2004 | Yamakawa et al. | |
| 8,211,259 B2 | 7/2012 | Sato et al. | |
| 2003/0145940 A1* | 8/2003 | Chaudhury et al. ........ | 156/272.6 |
| 2003/0159773 A1* | 8/2003 | Tomiyama et al. ............ | 156/248 |
| 2009/0226741 A1* | 9/2009 | Asuke ........................... | 428/447 |

FOREIGN PATENT DOCUMENTS

| | | |
|---|---|---|
| JP | 05-082404 | 4/1993 |
| JP | 05-338184 | 12/1993 |
| JP | 09-208829 | 8/1997 |
| JP | 09-286971 | 11/1997 |
| JP | 10-081869 | 3/1998 |
| JP | 11-158437 | 6/1999 |
| JP | 11158437 A * | 6/1999 |
| JP | 11-315144 | 11/1999 |
| JP | 2000-235108 | 8/2000 |
| JP | 2001-019936 | 1/2001 |
| JP | 2003-066299 | 3/2003 |

\* cited by examiner

Primary Examiner — Daniel McNally

(57) ABSTRACT

A bonding method of bonding two base members together through a bonding film having a fine pattern at low cost, and a bonded body with the bonding film which is formed using the bonding method are provided. The bonding method is a method for forming a bonded body in which a first base member and a second base member are bonded together through a bonding film having a predetermined pattern. The bonding method includes: applying a liquid material containing a silicone material composed of silicone compounds onto a surface of at least one of the first and second base members using a liquid droplet ejecting method, to form a liquid coating having a pattern corresponding to the predetermined pattern on the surface; drying the liquid coating so that it is transformed into the bonding film having the predetermined pattern on the surface of the at least one of the first and second base members; and applying energy to the bonding film so that a bonding property is developed in the vicinity of a surface thereof, to thereby bond the first and second base members together through the bonding film.

13 Claims, 8 Drawing Sheets

BONDING METHOD AND BONDED BODY

CROSS-REFERENCE TO RELATED APPLICATION

This application claims a priority to Japanese Patent Application No. 2007-307620 filed on Nov. 28, 2007 which is hereby expressly incorporated by reference herein in its entirety.

BACKGROUND

1. Technical Field

The present invention relates to a bonding method and a bonded body.

2. Related Art

Conventionally, an etching method using a mask mainly composed of resin is widely utilized as a method of forming a film having a predetermined pattern on a substrate (see JP-A-5-338184). Specifically, formation of the film having the predetermined pattern on the substrate is performed as follows.

I: a layer composed of a material for forming the film is formed on the substrate. II: a resist material is applied onto the layer. III: the resist material is exposed and developed to obtain a resist layer having an opening corresponding to an unnecessary portion of the layer. IV: the unnecessary portion of the layer exposed inside the opening is removed by the etching method using the resist layer as the mask. V: the resist layer (the mask) is removed.

Such a method of forming the film having the predetermined pattern is used in forming a bonding film having a predetermined pattern, wherein the bonding film is utilized when bonding two base members together.

However, since use of the above method requires a time and a labor hour for forming the resist layer, there are a problem in that it takes a long time or a high cost to form the film (the bonding film).

SUMMARY

Accordingly, it is an object of the present invention to provide a bonding method of bonding two base members together through a bonding film having a fine pattern at low cost, and a bonded body with the bonding film which is formed using the bonding method.

A first aspect of the present invention is directed to a bonding method of forming a bonded body in which a first base member and a second base member are bonded together through a bonding film having a predetermined pattern. The bonding method comprises: applying a liquid material containing a silicone material composed of silicone compounds onto a surface of at least one of the first and second base members using a liquid droplet ejecting method, to form a liquid coating having a pattern corresponding to the predetermined pattern on the surface; drying the liquid coating so that it is transformed into the bonding film having the predetermined pattern on the surface of the at least one of the first and second base members; and applying energy to the bonding film so that a bonding property is developed in the vicinity of a surface thereof, to thereby bond the first and second base members together through the bonding film.

This makes it possible to bond the first and second base members together through the bonding film having the predetermined pattern, that is, a fine pattern at low cost.

In the above bonding method, it is preferred that each of the silicone compounds has a polydimethylsiloxane chemical structure as a main chemical structure thereof.

Such silicone compounds can be relatively easily available at a low price. Further, such silicone compounds can be preferably used as a major component of the silicone material because methyl groups of the silicone compounds are easily removed from their chemical structures by applying the energy to the bonding film containing the silicone compounds, so that the bonding property is reliably developed in the bonding film.

In the above bonding method, it is preferred that each of the silicone compounds has at least one silanol group.

In this case, when drying the liquid coating to transform it into the bonding film, hydroxyl groups included in the silanol groups of the adjacent silicone compounds are bonded together. Therefore, the thus formed bonding film can have more excellent film strength.

In the above bonding method, it is preferred that the bonded body is obtained by developing the bonding property in the vicinity of the surface of the bonding film by applying the energy thereto, and then making the first and second base members contact with each other through the bonding film.

This makes it possible to bond the first and second base members together through the bonding film having the predetermined pattern, that is, a fine pattern at low cost.

In the above bonding method, it is preferred that the bonded body is obtained by making the first and second base members contact with each other through the bonding film, and then developing the bonding property in the vicinity of the surface of the bonding film by applying the energy thereto.

This also makes it possible to bond the first and second base members together through the bonding film having the predetermined pattern, that is, a fine pattern at low cost.

In the above bonding method, it is preferred that the liquid droplet ejecting method is an ink jet method by which the liquid material is ejected in the form of liquid droplets from a nozzle provided in an ink jet head by utilizing vibration of a piezoelectric element.

According to the ink jet method, the liquid material can be applied onto a desired region (position) in the form of the liquid droplets with excellent positional accuracy.

Further, by appropriately setting a frequency of the piezoelectric element, a viscosity of the liquid material and the like to specific ranges, a size of each of the liquid droplets can be controlled relatively easily. Therefore, in the case where the size of each of the liquid droplets is set to a small size, even if a shape of a region where the bonding film is to be formed is fine, the liquid coating can be reliably formed so as to correspond to the fine shape of the region.

In the above bonding method, it is preferred that the predetermined pattern is of a shape corresponding to that of a region of the surface on which the bonding film is formed.

In the above bonding method, it is preferred that the applying the energy is performed by at least one method selected from the group comprising a method in which an energy beam is irradiated on the bonding film, a method in which the bonding film is heated and a method in which a compressive force is applied to the bonding film.

This makes it possible to effectively activate the surface of the bonding film. Further, according to the above method, it is possible to prevent excessive breakage of the molecular bonds of the silicone compounds contained in the bonding film. Therefore, it is possible to prevent a property of the bonding film from being lowered.

In the above bonding method, it is preferred that the energy beam is an ultraviolet ray having a wavelength of 126 to 300 nm.

Use of the ultraviolet ray having such a wavelength makes it possible to optimize an amount of the energy to be applied to the bonding film. As a result, it is possible to prevent excessive breakage of the molecular bonds of the silicone compounds contained in the bonding film as the major component thereof, and to selectively break the molecular bonds of the silicone compounds present in the vicinity of the surface of the bonding film. This also makes it possible for the bonding film to develop the bonding property, while preventing a property thereof from being lowered.

In the above bonding method, it is preferred that a temperature of the heating is in the range of 25 to 100° C.

This makes it possible to reliably improve bonding strength between the first base member and the second base member while reliably preventing them (the bonded body) from being thermally altered and deteriorated.

In the above bonding method, it is preferred that the compressive force is in the range of 0.2 to 10 MPa.

This makes it possible to reliably improve bonding strength between the first base member and the second base member, while preventing occurrence of damages and the like therein due to an excess pressure.

In the above bonding method, it is preferred that the applying the energy is performed in an air atmosphere.

By doing so, it becomes unnecessary to spend a labor hour and a cost for controlling the ambient atmosphere. This makes it possible to easily perform the application of the energy.

In the above bonding method, it is preferred that an average thickness of the bonding film is in the range of 10 to 10,000 nm.

This makes it possible to prevent dimensional accuracy of the bonded body obtained by bonding the first base member an d the second base member together from being significantly lowered, thereby enabling to more firmly bond them together.

In the above bonding method, it is preferred that at least a portion of each of the first and second base members which makes contact with the bonding film is composed of a silicon material, a metal material or a glass material as a major component thereof.

This makes it possible to improve bonding strength of the bonding film to each of the first and second base members, even if each of them is not subjected to a surface treatment.

In the above bonding method, it is preferred that a surface of each of the first and second base members which makes contact with the bonding film has been, in advance, subjected to a surface treatment for improving bonding strength between each of the first and second base members and the bonding film.

By doing so, since the surface of each of the first and second base members which makes contact with the bonding film can be cleaned and activated, the bonding film can chemically affect the surface easily. As a result, bonding strength between the bonding film and each of the first and second base members becomes higher.

In the above bonding method, it is preferred that the surface treatment is a plasma treatment or an ultraviolet ray irradiation treatment.

Use of the plasma treatment or the ultraviolet ray irradiation treatment makes it possible to particularly optimize the surface of each of the first and second base members so that the bonding film can be reliably formed thereon.

It is preferred that the above bonding method further comprises subjecting the bonded body to a treatment for improving bonding strength between the first and second base members after they are bonded together through the bonding film.

This makes it possible to further improve the bonding strength between the first base member and the second base member.

In the above bonding method, it is preferred that the subjecting the treatment is performed by at least one method selected from the group comprising a method in which an energy beam is irradiated on the bonded body, a method in which the bonded body is heated and a method in which a compressive force is applied to the bonded body.

This makes it possible to further improve the bonding strength between the first base member and the second base member easily.

A second aspect of the present invention is directed to a bonded body comprises: a first base member; a second base member; and a bonding film through which the first and second base members are bonded together, wherein the first and second base members are bonded together through the bonding film using the above bonding method.

Such a bonded body can have high reliability.

DESCRIPTION OF EXEMPLARY EMBODIMENTS

Hereinafter, a bonding method and a bonded body according to the present invention will be described in detail with reference to preferred embodiments shown in the accompanying drawings.

Prior to description of the bonding method and the bonded body according to the present invention, description will be made on one example of a liquid droplet ejection apparatus used in the bonding method according to the present invention.

Liquid Droplet Ejection Apparatus

Figure 1:
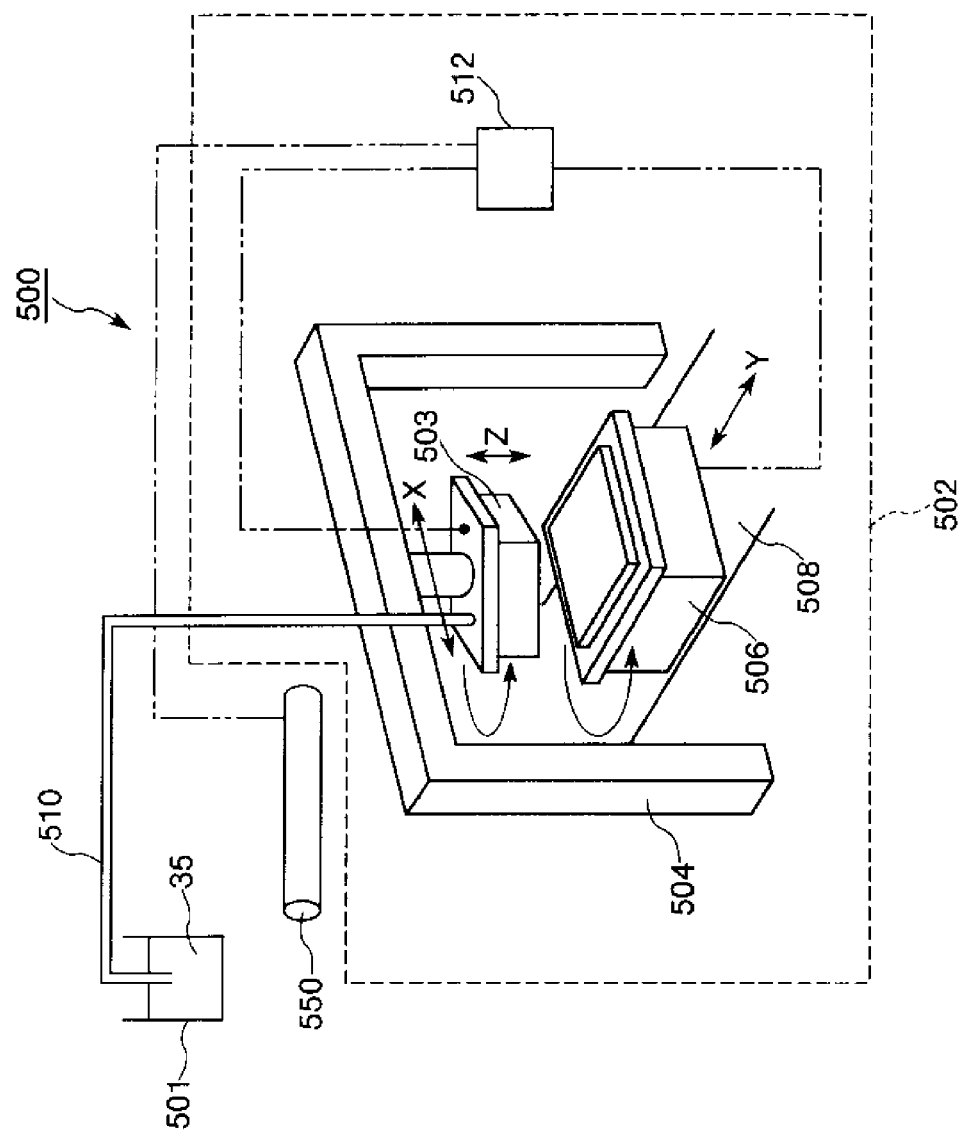
FIG. 1 is a perspective view showing a liquid droplet ejection apparatus used in a bonding method according to the present invention.
Figure 2A:
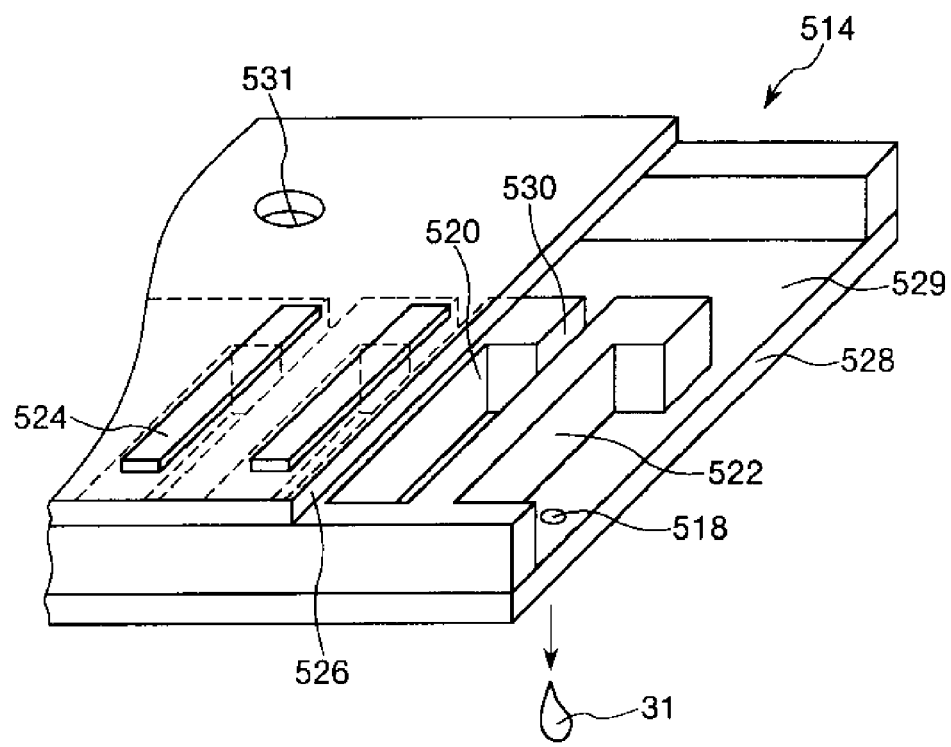
FIG. 2A is a perspective view showing a liquid droplet ejection head of the liquid droplet ejection apparatus shown in FIG. 1.
Figure 2B:
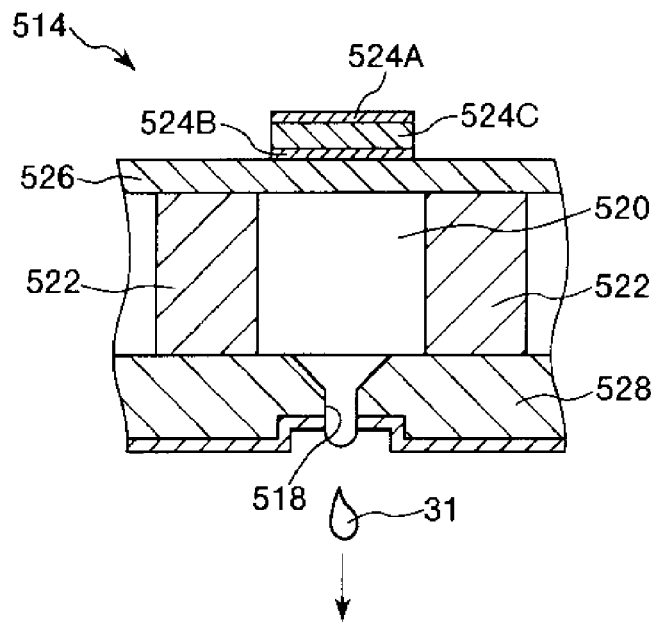
FIG. 2B is a cross sectional view showing the liquid droplet ejection head.

FIG. 1 is a perspective view showing the liquid droplet ejection apparatus used in the bonding method according to the present invention. FIG. 2A is a perspective view showing a liquid droplet ejection head of the liquid droplet ejection apparatus shown in FIG. 1, and FIG. 2B is a cross sectional view showing the liquid droplet ejection head.

As shown in FIG. 1, the liquid droplet ejection apparatus 500 used in this step includes a tank 501 which stores a liquid material 35 used in forming a bonding film 3 which will be described below, a tube 510, and an ejecting and scanning section 502 to which the liquid material 35 is supplied from the tank 501 through the tube 510.

The ejecting and scanning section 502 includes a liquid droplet ejection means 503 which is provided with a droplet ejection head (an ink jet head) 514, a first position control means (moving means) 504 which controls a position of the liquid droplet ejection means 503, and a stage 106 which supports at least one of a first base member 21 and a second base member 22 (hereinafter, collectively referred to as "base member" on occasion) on which the bonding film 3 described below is to be formed, a second position control means (moving means) 508 which controls a position of the stage 506, and a control means 512.

The tank 501 and the liquid droplet ejection head 514 of the liquid droplet ejection means 503 are coupled with the tube 510 so that the liquid material 35 is supplied to the liquid droplet ejection head 514 from the tank 501 by means of compressed air.

The control means (control unit) 512 is constructed from a computer such a microcomputer or a personal computer which incorporates, e.g., a function section, a memory and the like thereinto. In the control means 512, signals (data) are continually inputted from an operation section not shown in the drawings.

Further, the control means 512 controls action (driving) of the respective parts of the liquid droplet ejection apparatus 500 according to a predetermined program in response to the signals and the like from the operation section.

The first position control means 504 moves the liquid droplet ejection means 503 in an X-axis direction and a Z-axis direction which is perpendicular to the X-axis direction in response to signals from the control means 512. Further, the first position control means 504 also has a function of rotationally moving the liquid droplet ejection means 503 about an axis parallel to the Z-axis.

In this regard, in this embodiment, the Z-axis is a direction parallel to a vertical direction (that is, a direction of the gravity acceleration).

The second position control means 508 moves the stage 506 in the X-axis direction and a Y-axis direction perpendicular to both the X-axis direction and the Z-axis direction in response to signals from the control means 512. Further, the second position control means 508 also has a function of rotationally moving the stage 506 about an axis parallel to the Z-axis.

The stage 506 has a surface which is parallel to both the X-axis direction and the Y-axis direction. Further, the stage 506 is configured so that the base member, on which the bonding film 3 is to be formed by applying the liquid material 35 onto a surface thereof, is supported or fixedly mounted on the surface of the stage 506.

As described above, the liquid droplet ejection means 503 is moved by the first position control means 504 in the X-axis direction. On the other hand, the stage 506 is moved by the second position control means 508 in the Y-axis direction.

Namely, a relative position of the liquid droplet ejection head 514 with respect to the stage 506 is changed by the first position control means 504 and the second position control means 508 (that is to say, the base member supported on the stage 506 and the liquid droplet ejection means 503 are relatively moved to each other).

The control means 512 is configured so as to receive data that represents relative positions to which the liquid material 35 is to be ejected from an external data processing apparatus.

When the liquid material 35 is applied onto the surface of the base member, it is ejected toward it while relatively moving the liquid droplet ejection head 514 and the base member.

Specifically, the stage 506 supporting the base member is moved in the Y-axis direction by the action of the second position control means 508, and passed under the liquid droplet ejection means 503. At this time, liquid droplets (ink droplets) 31 of the liquid material 35 are ejected from a nozzle 518 of the liquid droplet ejection head 514 included in the liquid droplet ejection means 503 while moving it in the X-axis direction by the action of the first position control means 504.

In this way, the liquid droplets 31 are applied (landed) onto a film formation region 41 provided on the surface of the base member. Hereinafter, this operation is referred to as "liquid material applying and scanning operation" on occasion. The liquid material applying and scanning operation includes a moving operation of the liquid droplet ejection head 514 in the X-axis direction and a moving operation of the base member in the Y-axis direction.

In the step of applying the liquid material 35 onto the film formation region 41 of the base member, generally, a plurality of the liquid material applying and scanning operation are preformed. In this regard, it goes without saying that only one liquid material applying and scanning operation may be acceptable.

As shown in FIGS. 2A and 2B, the liquid droplet ejection head 514 is constructed from an ink jet head. Namely, the liquid droplet ejection apparatus 500 described in this embodiment is an ink jet apparatus.

The liquid droplet ejection head 514 is provided with a vibration plate 526 and a nozzle plate 528. Between the vibration plate 526 and the nozzle plate 528, there is provided a liquid storage 529, which is always to be filled with the liquid material 35 supplied from the tank 501 through a hole 531.

Further, between the vibration plate 526 and the nozzle plate 528, a plurality of partition walls 522 are provided. A portion defined by the vibration plate 526, the nozzle plate 528 and a pair of the partition walls 522 forms a cavity (an ink chamber) 520.

Since each cavity 520 is provided so as to correspond to the corresponding nozzle 518, the number of the cavities 520 is the same as that of the nozzles 518. Each of the cavities 520 is adapted to be supplied with the liquid material 35 from the liquid storage 529 through a supply space 530 positioned between the pair of the partition walls 520.

On the vibration plate 526, vibrating elements 524 are provided so as to correspond to the respective cavities 520. Each of the vibrating elements 524 includes a piezoelectric element 524C and a pair of electrodes 524A and 524B between which the piezoelectric element 524C is provided.

By applying (supplying) a driving voltage across the electrodes 524A and 524B, the vibration plate 526 is vibrated according to vibration of the piezoelectric element 524C so that the liquid material 35 is ejected in the form of the liquid droplets 31 from the corresponding nozzle 518.

In this case, by controlling conditions of the driving voltage such as magnitude of the driving voltage, an ejecting amount (a liquid droplet amount) per one ejecting operation of the liquid material 35 to be ejected from each nozzle 518 is rendered adjustable. Further, a shape of each nozzle 518 is configured so that the liquid material 35 is ejected from the nozzle 518 in the Z-axis direction.

The control means 512 may be configured so that signals are applied to the plurality of the vibrating elements 524, respectively, to drive the vibrating elements 524 independently to each other. In other words, the ejecting amount per one ejecting operation of the liquid material 35 to be ejected from each nozzle 518 may be controlled in every nozzles 518 in response to the signal from the control means 512.

Further, the control means 512 may selectively determine nozzles 518 that can eject the liquid material 35 during the liquid material applying and scanning operation and nozzles 518 that cannot eject the liquid material 35 during the liquid material applying and scanning operation.

In this regard, it is to be noted that an ejection portion is configured by a portion that includes one nozzle 518, a cavity 520 corresponding to the nozzle 518 and a vibrating element 524 corresponding to the cavity 520. One liquid droplet ejection head 514 has the ejection portions of which number is the same as the number of the nozzles 518.

By ejecting the liquid material 35 in the form of the liquid droplets 31 onto the surface (an upper surface) of the base member using such a liquid droplet ejection apparatus 500, the liquid material 35 can be applied onto a required region of the surface (a bonding surface 23 or 24) of the base member.

This makes it possible to form a liquid coating 30 having a shape corresponding to that of the film formation region 41 provided on the bonding surface 23 or 24 of the base member, and thereby forming the bonding film 3 thereon reliably. Namely, a liquid coating 30 (a bonding film 3) having a predetermined pattern can be reliably formed on the base member.

In this regard, it is also to be noted that in present invention, an electrostatic actuator may be employed as the driving element of the liquid droplet ejection head 514 instead of the piezoelectric element 524C. Alternatively, the liquid droplet ejection head 514 may employ a thermoelectric conversion element as the driving element, and have a configuration in which the liquid material 35 is ejected using its thermal expansion caused by the thermoelectric conversion element (which is sometimes called a bubble jet method wherein the term "bubble jet" is a registered trademark).

The liquid droplet ejection apparatus 500 of this embodiment further includes an UV lamp (an ultraviolet ray irradiation lamp) 550 provided adjacent to the ejecting and scanning section 502. The control means 512 is connected to the UV lamp 550, and controls action (driving) thereof according to a predetermined program in response to the signals and the like from the operation section.

Since the liquid droplet ejection apparatus 500 includes such an UV lamp 550, it can irradiate an ultraviolet ray on the bonding film 3 formed on the base member, to thereby develop a bonding property in the vicinity of the bonding film 3.

Specifically, after the bonding film 3 is formed on the base member, the stage 506 is moved by the action of the second position control means 508 in the Y-axis direction, and the base member (the bonding film 3) is positioned under the UV lamp 550. At this position, energy is applied to the bonding film 3 by irradiating the ultraviolet ray thereon using the UV lamp 550, so that the bonding property can be developed in the vicinity of the bonding film 3.

In the bonding method of the present invention, the bonding film 3 having the predetermined pattern, which is used for bonding the base members 21 and 22 together, is formed on the base member using the above liquid droplet ejection apparatus 500.

Hereinafter, the bonding method of the present invention will be described.

Bonding Method

The bonding method of the present invention is a method by which the first base member 21 and the second base member 22 are bonded together through the bonding film 3 having the predetermined pattern.

The bonding method comprises: applying the liquid material 35 containing a silicone material composed of silicone compounds in the form of the liquid droplets 31 onto the surface (the bonding surface 23 or 24) of at least one of the first and second base members 21 and 22 using the liquid droplet ejecting method, to form a liquid coating 30 having a pattern corresponding to the predetermined pattern on the surface; drying the liquid coating 30 so that it is transformed into the bonding film 3 having the predetermined pattern on the at least one of the first and second base members 21 and 22; and applying the energy to the bonding film 3 so that the bonding property is developed in the vicinity of the surface thereof, to thereby bond the first and second base members 21 and 22 together through the bonding film 3 so that a bonded body 1 is obtained.

According to the bonding method, the base members 21 and 22 can be firmly bonded together due to the bonding property developed in the vicinity of the bonding film 3 containing the silicone material as a raw material and having the predetermined pattern with high regioselectivity and dimensional accuracy.

Further, the liquid material 35 is regioselectively applied onto at least one of the bonding surfaces 23 and 24 of the base members 21 and 22 using the liquid droplet ejecting method so as to become a pattern corresponding to the predetermined pattern. This makes it possible to reliably prevent waste of the liquid material 35 from being increased.

Furthermore, in the present invention, the liquid material 35 is applied onto the at least one of the bonding surfaces 23 and 24 of the base members 21 and 22 using the liquid droplet ejecting method, the use of the liquid droplet ejecting method makes it possible to form a liquid coating 30 having a fine shape (a fine pattern) on the at least one of the base members 21 and 22. Therefore, it is possible to form the bonding film 3 with excellent dimensional accuracy.

In this regard, in this specification, the term "predetermined pattern" means a pattern which is of a shape corresponding to that of a region to be bonded using the bonding film 3. In this embodiment, the term "predetermined pattern" means a pattern which is of a shape corresponding to that of the film formation region 41 of the at least one of the bonding surfaces 23 and 24.

Hereinafter, a first embodiment of the bonding method according to the present invention will be described one after another.

First Embodiment

FIGS. 3A to 3D and 4E to 4G are sectional views for explaining the first embodiment of the bonding method according to the present invention. In this regard, it is to be noted that in the following description, an upper side in each of FIGS. 3A to 3D and 4E to 4G will be referred to as "upper" and a lower side thereof will be referred to as "lower".

In the bonding method of this embodiment, the bonding film 3 having the predetermined pattern is selectively formed on the first base member 21 without forming it on the second base member 22, and then the first base member 21 and the second base member 22 are bonded together through the bonding film 3.

[1] First, the first base member 21 and the second base member 22 are prepared. In this regard, the second base member 22 is not shown in FIG. 3A.

A constituent material of each of the first base member 21 and the second base member 22 is not particularly limited to a specific type. Examples of the constituent material of each of them include: a resin-based material such as polyolefin (e.g., polyethylene, polypropylene, ethylene-propylene copolymer, ethylene-acrylate copolymer, ethylene-acrylic acid copolymer, polybutene-1, ethylene-vinyl acetate copolymer (EVA)), cyclic polyolefin, denatured polyolefin, polyvinyl chloride, polyvinylidene chloride, polystyrene, polyamide, polyimide, polyamide-imide, polycarbonate, poly-(4-methylpentene-1), ionomer, acrylic resin, polymethyl methacrylate (PMMA), acrylonitrile-butadiene-styrene copolymer (ABS resin), acrylonitrile-styrene copolymer (AS resin), butadiene-styrene copolymer, polyoxymethylene, polyvinyl alcohol (PVA), ethylene-vinyl alcohol copolymer (EVOH), polyester (e.g., polyethylene terephthalate (PET), polyethylene naphthalate, polybutylene terephthalate (PBT), polycyclohexane terephthalate (PCT)), polyether, polyether ketone (PEK), polyether ether ketone (PEEK), polyether imide, polyacetal (POM), polyphenylene oxide, denatured polyphenylene oxide, polysulfone, polyether sulfone, polyphenylene sulfide, polyarylate, aromatic polyester (e.g., liquid crystal polymer), fluoro resin (e.g., polytetrafluoroethylene, polyfluorovinylidene), thermoplastic elastomer (e.g., styrene-based elastomer, polyolefin-based elastomer, polyvinylchloride-based elastomer, polyurethane-based elastomer, polyester-based elastomer, polyamide-based elastomer, polybutadiene-based elastomer, trans-polyisoprene-based elastomer, fluororubber-based elastomer, chlorinated polyethylene-based elastomer), epoxy resin, phenolic resin, urea resin, melamine resin, aramid resin, unsaturated polyester, silicone resin, polyurethane, or a copolymer, a blended body and a polymer alloy each having at least one of these materials as a major component thereof; a metal-based material such as a metal (e.g., Fe, Ni, Co, Cr, Mn, Zn, Pt, Au, Ag, Cu, Pd, Al, W, Ti, V, Mo, Nb, Zr, Pr, Nd, Sm), an alloy containing at least one of these metals, carbon steel, stainless steel, indium tin oxide (ITO) or gallium arsenide; a silicon-based material such as monocrystalline silicon, polycrystalline silicon or amorphous silicon; a glass-based material such as silicic acid glass (quartz glass), silicic acid alkali glass, soda lime glass, potash lime glass, lead (alkaline) glass, barium glass or borosilicate glass; a ceramic-based material such as alumina, zirconia, $MgAl_2O_4$, ferrite, silicon nitride, aluminum nitride, boron nitride, titanium nitride, carbon silicon, boron carbide, titanium carbide or tungsten carbide; a carbon-based material such as graphite; a complex material containing any one kind of the above materials or two or more kinds of the above materials; and the like.

Further, a surface of each of the first and second base members 21 and 22 may be subjected to a plating treatment such as a Ni plating treatment, a passivation treatment such as a chromate treatment, a nitriding treatment, or the like.

The constituent material of the first base member 21 may be different from or the same as that of the second base member 22.

It is preferred that the first base member 21 and the second base member 22 have substantially equal thermal expansion coefficients with each other. In the case where the first base member 21 and the second base member 22 have the substantially equal thermal expansion coefficients with each other, when the first base member 21 and the second base member 22 are bonded together, stress due to thermal expansion is less easily generated on a bonding interface therebetween. As a result, it is possible to reliably prevent occurrence of peeling in the bonded body 1 finally obtained.

As described in detail below, even if first base member 21 and the second base member 22 have the different thermal expansion coefficients with each other, by optimizing conditions for bonding between the first base member 21 and the second base member 22 in the after step, they can be firmly bond together with high dimensional accuracy.

Furthermore, it is preferred that the two base members 21 and 22 have different rigidities. This makes it possible to more firmly bond the two base members 21 and 22 together.

Moreover, it is preferred that at least one base member of the two base members 21 and 22 is composed of a resin material. The base member composed of the resin material can be easily deformed due to plasticity of the resin material itself.

Therefore, it is possible to reduce stress which would be generated on the bonding interface between the two base members 21 and 22 (e.g., stress due to thermal expansion thereof) when they are bonded together through the bonding film 3. As a result, breaking of the bonding interface becomes hard. This makes it possible to obtain a bonded body 1 having high bonding strength between the two base members 21 and 22.

From the above viewpoint, it is preferred that at least one base member of the two base members 21 and 22 has flexibility. This makes it possible to obtain a bonded body 1 having improved bonding strength between the two base members 21 and 22.

In addition, in the case where the two base members 21 and 22 have flexibility, it is possible to obtain a bonded body 1 having flexibility as a whole thereof. Therefore, such a bonded body 1 can have high functionality.

Further, a shape of each of the base members 21 and 22 may be a plate shape (a film shape), a massive shape (a blocky shape), a stick shape, or the like, as long as it has a shape with a surface which can support the bonding film 3.

In this embodiment, as shown in FIGS. 3A to 3D and 4E to 4G, since each of the base members 21 and 22 has a plate shape, they can easily bend. Therefore, one of the base members 21 and 22 becomes sufficiently bendable (deformable) according to a shape of the other base member when they are laminated together. This makes it possible to improve bonding strength between the base members 21 and 22 in the finally obtained bonded body 1.

In addition, since the base members 21 and 22 can easily bend, stress which would be generated in the bonding interface therebetween can be reduced to some extent. In this case, an average thickness of each of the base members 21 and 22 is not particularly limited to a specific value, but is preferably in the range of about 0.01 to 10 mm, and more preferably in the range of about 0.1 to 3 mm.

Next, the bonding surface 23 of the first base member 21 is subjected to a surface treatment for improving bonding strength between the first base member 21 and the bonding film 3 to be formed, if need.

By doing so, since the bonding surface 23 is cleaned and activated, the bonding film 3 can chemically affect the bonding surface 23 easily. As a result, in the subsequent step, when the bonding film 3 is formed on the bonding surface 23, it is possible to improve the bonding strength between the bonding film 3 and the bonding surface 23.

Such a surface treatment is not particularly limited to a specific type. Examples of the surface treatment include: a physical surface treatment such as a sputtering treatment or a blast treatment; a chemical surface treatment such as a plasma treatment performed using oxygen plasma and nitrogen plasma, a corona discharge treatment, an etching treatment, an electron beam irradiation treatment, an ultraviolet ray irradiation treatment or an ozone exposure treatment; a treatment performed by combining two or more kinds of these surface treatments; and the like.

In this regard, it is to be noted that in the case where the first base member 21 to be subjected to the surface treatment is formed of a resin material (a polymeric material), the corona discharge treatment, the nitrogen plasma treatment and the like are particularly preferably used.

Especially, by carrying out the plasma treatment or the ultraviolet ray irradiation treatment as the surface treatment, it is possible to more reliably clean and activate the bonding surface 23. As a result, the bonding strength between the bonding surface 23 and the bonding film 3 can be especially improved.

Depending on the constituent material of the first base member 21, the bonding strength of the bonding film 3 to the first base member 21 becomes sufficiently high even if the bonding surface 23 of the first base member 21 is not subjected to the surface treatment described above.

Examples of the constituent material of the first base member 21 with which such an effect is obtained include materials containing various kinds of the metal-based material, various kinds of the silicon-based material, various kinds of the glass-based material and the like as a major component thereof.

The surface of the first base member 21 formed of such materials is covered with an oxide film. In the oxide film, hydroxyl groups exist in a surface thereof. Therefore, by using the first base member 21 covered with such an oxide film, it is possible to improve the bonding strength between the bonding surface 23 of the first base member 21 and the bonding film 3 without subjecting the bonding surface 23 to the surface treatment described above.

In this regard, it is to be noted that in this case, the entire of the first base member 21 may not be composed of the above materials, as long as a vicinity of the bonding surface 23 of the first base member 21 at least within the film formation region 41, on which the bonding film 3 is to be formed, is composed of the above materials.

Further, instead of the surface treatment, an intermediate layer may have been, in advance, provided on the bonding surface 23 of the first base member 21. This intermediate layer may have any function.

Such a function is not particularly limited to a specific kind. Examples of the function include: a function of improving bonding strength of the first base member 21 to the bonding film 3; a cushion property (that is, a buffering function); a function of reducing stress concentration; and the like. By forming the bonding film 3 on such an intermediate layer, a bonded body 1 having high reliability can be obtained finally.

A constituent material of the intermediate layer include: a metal-based material such as aluminum or titanium; an oxide-based material such as metal oxide or silicon oxide; a nitride-based material such as metal nitride or silicon nitride; a carbon-based material such as graphite or diamond-like carbon; a self-organization film material such as a silane coupling agent, a thiol-based compound, a metal alkoxide or a metal halide; a resin-based material such as a resin-based adhesive agent, a resin filming material, a resin coating material, various rubbers or various elastomers; and the like, and one or more of which may be used independently or in combination.

Among intermediate layers composed of these various materials, use of the intermediate layer composed of the oxide-based material makes it possible to further improve the bonding strength between the first base member 21 and the bonding film 3 through the intermediate layer.

On the other hand, like the first base member 21, the bonding surface 24 (that is, a surface which makes contact with the bonding film 3 in the step described below) of the second base member 22 may have been, in advance, subjected to a surface treatment for improving bonding strength between the bonding surface 24 and the bonding film 3, if need.

By doing so, the bonding surface 24 is cleaned and activated. As a result, when the first base member 21 and the second base member 22 are laminated and bonded together through the bonding film 3, it is possible to improve the bonding strength between the bonding surface 24 and the bonding film 3.

Such a surface treatment is not particularly limited to a specific type, but the same surface treatment as the above mentioned surface treatment, to which the bonding surface 23 of the first base member 21 is subjected, can be used.

Further, like the first base member 21, depending on the constituent material of the second base member 22, the bonding strength between the bonding surface 24 and the bonding film 3 becomes sufficiently high even if the bonding surface 24 is not subjected to the above surface treatment.

Examples of the constituent material of the second base member 22 with which such an effect is obtained include the above mentioned materials containing the various kinds of the metal-based material, the various kinds of the silicon-based material, the various kinds of the glass-based material and the like as the main material thereof.

The surface of the second base member 22 formed of such materials is covered with an oxide film. In the oxide film, hydroxyl groups exist (are exposed) in a surface thereof. Therefore, by using such a second base member 22 covered with the oxide film, it is possible to improve the bonding strength between the bonding surface 24 of the second base member 22 and the bonding film 3 without subjecting the bonding surface 24 to the surface treatment described above.

In this regard, it is to be noted that in this case, the entire of the second base member 22 may not be composed of the above materials, as long as a vicinity of the bonding surface 24 of the second base member 22 at least within a region, to which the bonding film 3 is to be bonded, is composed of the above materials.

Furthermore, if the bonding surface 24 of the second base member 22 has the following groups and substances, the bonding strength between the bonding surface 24 of the second base member 22 and the bonding film 3 can become sufficiently high even if the bonding surface 24 is not subjected to the surface treatment described above.

Examples of such groups and substances include at least one group or substance selected from the group comprising various kinds of functional groups such as a hydroxyl group, a thiol group, a carboxyl group, an amino group, a nitro group and an imidazole group, various kinds of radicals, leaving intermediate molecules such as an open circular molecule and a molecule having at least one unsaturated (double or triple) bond, halogen such as F, Cl, Br or I, and peroxides, and dangling bonds (or uncoupled bonds) generated by leaving the above groups from atoms to which they had been bonded (that is, dangling bonds present in the atoms not terminated by leaving the above groups therefrom).

Among the leaving intermediate molecules, hydrocarbon molecules each including the open circular molecule or the unsaturated bond are preferably selected. Such hydrocarbon molecules affect the bonding film 3 based on marked reactivity thereof. Therefore, the bonding surface 24 having such hydrocarbon molecules can be particularly firmly bonded to the bonding film 3.

Further, among the functional groups, the hydroxyl group is preferably selected. In the case where the bonding surface 24 has a plurality of the hydroxyl groups, it becomes possible for the bonding surface 24 to firmly bond to the bonding film 3 with ease.

Especially, in the case where the hydroxyl groups are exposed on the surface 32 of the bonding film 3, the bonding surface 24 and the bonding film 3 can be firmly bonded together for a short period of time based on hydrogen bonds which would be generated between the hydroxyl groups of the bonding surface 24 and the hydroxyl groups of the surface 32.

By appropriately performing one selected from various surface treatment described above, the bonding surface 24 having such groups and substances can be obtained. This makes it possible to obtain a second base member 22 that can be firmly bonded to the bonding film 3.

Among them, it is preferred that the hydroxyl groups exist on the bonding surface 24 of the second base member 22. Such a bonding surface 24 and the bonding film 3 exposing the hydroxyl groups strongly attract with each other to form hydrogen bonds between the hydroxyl groups. Finally, this makes it possible to particularly firmly bond the first base member 21 and the second base member 22.

Further, like the first base member 21, instead of the surface treatment, a surface layer may have been, in advance, provided on the bonding surface 24 of the second base member 22. This surface layer may have any function, like in the case of the first base member 21.

Such a function is not particularly limited to a specific kind. Examples of the function include: a function of improving the bonding strength of the second base member 22 to the bonding film 3; a cushion property (that is, a buffering function); a function of reducing stress concentration; and the like. By bonding the second base member 22 and the bonding film 3 through such a surface layer, a bonded body 1 having high reliability can be obtained finally.

As for a constituent material of such a surface layer, for example, the same material as the constituent material of the intermediate layer formed on the bonding surface 23 of the first base member 21 can be used.

In this regard, it is to be noted that such a surface treatment and formation of the surface layer may be carried out, if necessary. For example, in the case where high bonding strength between the first base member 21 and the second base member 22 is not required, the surface treatment and formation of the surface layer can be omitted.

[2] Next, the liquid material 35 containing the silicone material is applied onto the bonding surface 23 in the form of the liquid droplets 31 by the liquid droplet ejection method using the above mentioned liquid droplet ejection apparatus 500.

Figure 3A:
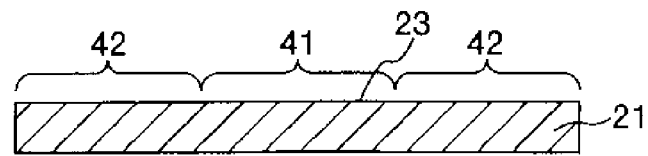
FIGS. 3A to 3D and 4E to 4G are sectional views for explaining a first embodiment of the bonding method according to the present invention.

This makes it possible to selectively apply the liquid droplets 31 onto the film formation region 41 of the bonding surface 23 shown in FIG. 3A without applying them onto a non-film formation region 42 other than the film formation region 41 of the bonding surface 23.

Figure 3B:
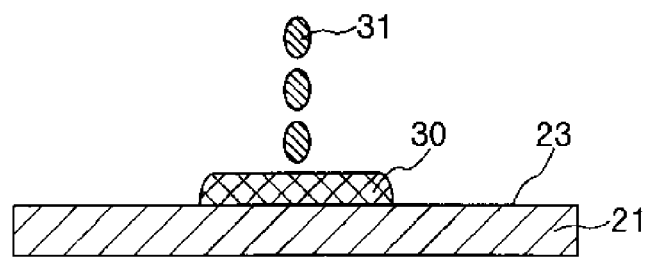
Figure 3C:
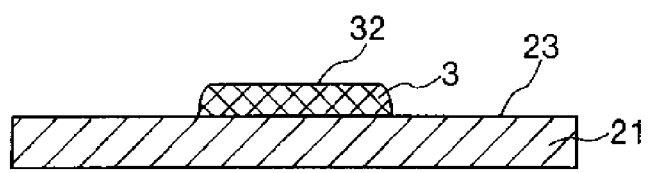

As a result, as shown in FIG. 3B, the liquid coating 30 having the pattern corresponding to the predetermined pattern, that is, the liquid coating 30 having the pattern being of the shape corresponding to that of the film formation region 41 can be formed on the first base member 21.

In the present invention, the liquid droplet ejecting method by which the liquid material 35 is ejected in the form of the liquid droplets 31 using the liquid droplet ejection apparatus 500 is used as the method by which the liquid material 35 is selectively applied onto the film formation region 41 of the bonding surface 23.

By regioselectively applying the liquid material 35 using the liquid droplet ejection method onto the film formation region 41 of the bonding surface 23, a time and a cost in forming the bonding film 3 can be reduced as compared with the use of the above mentioned method in which the resist layer is formed on the film provided on the substrate, and then the film is processed using the resist layer as the mask so as to have the predetermined pattern.

In addition, in this embodiment, as the liquid droplet ejecting method, used is an ink jet method in which the liquid material 35 is ejected using an ink jet head as the liquid droplet ejection head 514. According to the ink jet method, the liquid material 35 can be applied onto a desired region (position) in the form of the liquid droplets 31 with excellent positional accuracy.

By appropriately setting a frequency of the piezoelectric element 524C, a viscosity of the liquid material 35 and the like to specific ranges, a size of each of the liquid droplets 31 can be controlled relatively easily. Therefore, in the case where the size of each of the liquid droplets 31 is set to a small size, even if a shape of the film formation region 41 is fine, the liquid coating 30 can be reliably formed so as to correspond to the fine shape of the film formation region 41.

The viscosity (at 25° C.) of the liquid material 35 is, generally, preferably in the range of about 0.5 to 200 mPa·s, and more preferably in the range of about 3 to 20 mPa·s. By adjusting the viscosity of the liquid material 35 to the range noted above, the ejection of the liquid droplets 31 can be more stably performed.

Further, the adjustment of the viscosity of the liquid material 35 makes it possible to correctly eject liquid droplets 31 each having a size capable of forming a bonding film 3 having a fine pattern on a film formation region 41 whose shape corresponds to the fine pattern of the bonding film 3.

In addition, such a liquid material 35 can contain a sufficient amount of the silicone material therein. Therefore, by drying the liquid coating 30 formed of such a liquid material 35 in the following step [3], the bonding film 3 can be formed reliably.

Further, in the case where the viscosity of the liquid material 35 is set to the range noted above, an average amount of the liquid droplets 31 (of the liquid material 35) can be adjusted, specifically to the range of about 0.1 to 40 pL, and more realistically to the range of about 1 to 30 pL.

This makes it possible for a diameter of each of the liquid droplets 31 landed on the bonding surface 23 to become small. Therefore, it is possible to reliably form a bonding film 3 having a just fine pattern (shape).

Furthermore, by appropriately controlling the number of the liquid droplets 31 (the amount of the liquid material 35) to be applied onto the film formation region 41 of the bonding surface 23, it is possible to relatively easily adjust a thickness of the bonding film 3 to be formed.

As described above, although the liquid material 35 ejected in the form of the liquid droplets 31 contains the silicone material, in the case where the silicone material itself is in the form of liquid and has a required viscosity range, the silicone material can be used as the liquid material 35 directly.

On the other hand, in the case where the silicone material itself is in the form of solid or liquid having a high viscosity, a solution or dispersion liquid containing the silicone material can be used as the liquid material 35.

Examples of a solvent dissolving the silicone material or a dispersion medium for dispersing the same include: various kinds of inorganic solvents such as ammonia, water, hydrogen peroxide, carbon tetrachloride and ethylene carbonate; various kinds of organic solvents such as ketone-based solvents (e.g., methyl ethyl ketone (MEK) and acetone), alcohol-based solvents (e.g., methanol, ethanol and isopropanol), ether-based solvents (e.g., diethyl ether and diisopropyl ether), cellosolve-based solvents (e.g., methyl cellosolve), aliphatic hydrocarbon-based solvents (e.g., hexane and pentane), aromatic hydrocarbon-based solvents (e.g., toluene, xylene and benzene), aromatic heterocycle compound-based solvents (e.g., pyridine, pyrazine and furan), amide-based solvents (e.g., N,N-dimethylformamide), halogen compound-based solvents (dichloroethane and chloroform), ester-based solvents (e.g., ethyl acetate and methyl acetate), sulfur compound-based solvents (e.g., dimethyl sulfoxide (DMSO) and sulfolane), nitrile-based solvents (e.g., acetonitrile, propionitrile and acrylonitrile), organic acid-based solvents (e.g., formic acid and trifluoroacetic acid); mixture solvents each containing at least one kind of the above solvents; and the like.

The silicone material is contained in the liquid material 35 and is a main constituent material of the bonding film 3 which will be formed by drying the liquid material 35 in the following step [3].

Here, "silicone material" means a material composed of silicone compounds (molecules) each having a polyorganosiloxane chemical structure, that is, silicone compounds each having a main chemical structure (a main chain) mainly constituted of organosiloxane repeating units.

Each of the silicone compounds contained in the silicone material may have a branched chemical structure including a main chain and side chains each branched therefrom, a ringed chemical structure in which the main chain forms a ring shape, or a straight chemical structure in which both ends of the main chain are not bonded together.

In each silicone compound having the polyorganosiloxane chemical structure, for example, an organosiloxane repeating unit constituting each end portion of the polyorganosiloxane chemical structure is a repeating unit represented by the following general formula (1), an organosiloxane repeating unit constituting each connecting portion of the polyorganosiloxane chemical structure is a repeating unit represented by the following general formula (2), and an organosiloxane repeating unit constituting each branched portion of the polyorganosiloxane chemical structure is a repeating unit represented by the following general formula (3).

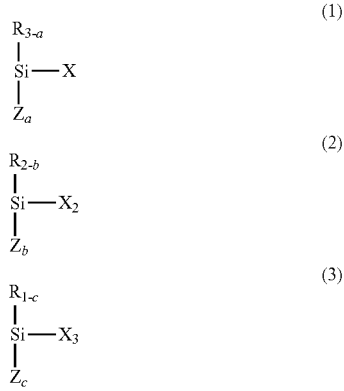

wherein in the general formulas (1) to (3), each of the Rs is independently a substituted hydrocarbon group or an unsubstituted hydrocarbon group, each of the Zs is independently a hydroxyl group or a hydrolysable group, each of the Xs is a siloxane residue, the a is 0 or an integer of 1 to 3, the b is 0 or an integer of 1 to 2, and the c is 0 or 1.

In this regard, the siloxane residue means a substituent group which is bonded to a silicon atom contained in an adjacent repeating unit via an oxygen atom to thereby form a siloxane bond. Specifically, the siloxane residue is a chemical structure of —O—(Si), wherein the Si is the silicon atom contained in the adjacent repeating unit.

In each silicone compound, the polyorganosiloxane chemical structure is preferably the straight chemical structure, that is, a chemical structure constituted of the repeating units each represented by the above general formula (1) and the repeating units each represented by the above general formula (2).

In the case where a silicone material composed of such silicone compounds is used, since in the following step [3], the silicone compounds are tangled together in the liquid material (the liquid coating 30) so that the bonding film 3 is formed, the thus formed bonding film 3 can have excellent film strength.

Specifically, examples of the silicone compound having such a polyorganosiloxane chemical structure include a silicone compound represented by the following general formula (4).

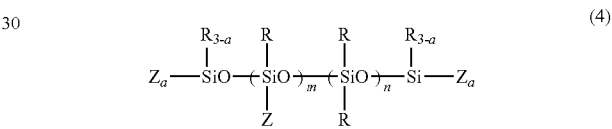

Wherein in the general formula (4), each of the Rs is independently a substituted hydrocarbon group or an unsubstituted hydrocarbon group, each of the Zs is independently a hydroxyl group or a hydrolysable group, the a is 0 or an integer of 1 to 3, the m is 0 or an integer of 1 or more, and the n is 0 or an integer of 1 or more.

In the general formulas (1) to (4), examples of the R (the substituted hydrocarbon group or unsubstituted hydrocarbon group) include: an alkyl group such as a methyl group, an ethyl group or a propyl group; a cycloalkyl group such as a cyclopentyl group or a cyclohexyl group; an aryl group such as a phenyl group, a tolyl group or a biphenylyl group; and an aralkyl group such as a benzyl group or a phenyl ethyl group.

Further, in the above groups, a part of or all hydrogen atoms bonding to carbon atom(s) may be respectively substituted by I) a halogen atom such as a fluorine atom, a chlorine atom or a bromine atom, II) an epoxy group such as a glycidoxy group, III) a (meth)acryloyl group such as an methacryl group, IV) an anionic group such as a carboxyl group or a sulfonyl group, and the like.

Examples of the hydrolysable group include: an alkoxy group such as a methoxy group, an ethoxy group, a propoxy group, a butoxy group; a ketoxime group such as a dimethyl ketoxime group or a methyl ethyl ketoxime group; an acyloxy group such as an acetoxy group; an alkenyloxy group such as an isopropenyloxy group or an isobutenyloxy group; and the like.

Further, in the general formula (4), the m and n represent a degree of polymerization of the polyorganosiloxane chemical structure. The total number of the m and n (that is, m+n) is preferably an integer of about 5 to 10,000, and more preferably an integer of about 50 to 1,000. By setting the degree of the polymerization to the above range, the viscosity of the liquid material 35 can be adjusted to the above mentioned range relatively easily.

Among various kinds of the silicone materials, it is preferable to use a silicone material composed of silicone compounds each having a polydimethylsiloxane chemical structure (that is, a chemical structure represented by the above general formula (4) in which the Rs are the methyl groups) as a main chemical structure thereof. Such silicone compounds can be relatively easily available at a low price.

Further, such silicone compounds can be preferably used as a major component of the silicone material because the methyl groups are easily broken and removed from their chemical structures by applying energy. Therefore, in the case where the bonding film 3 contains such a silicone material, when applying the energy to the bonding film 3 in the subsequent step [4], it is possible for the bonding film 3 to reliably develop the bonding property.

In addition, it is preferred that each of the silicone compounds has a t least on e silanol group. Specifically, it is preferable to use silicone compounds each having a chemical structure represented by the above general formula (4) in which the Zs are the hydroxyl groups.

In the case where the bonding film 3 is formed using the silicone material composed of such silicone compounds, when drying the liquid coating 30 to transform it into the bonding film 3 in the following step [3], the hydroxyl groups (included in the silanol groups) of the adjacent silicone compounds are bonded together. Therefore, the thus formed bonding film 3 can have more excellent film strength.

In addition, in the case where the first base member 21 described above, in which the hydroxyl groups are exposed on the bonding surface 23, is used, the hydroxyl groups (included in the silanol groups) of the silicone compounds and the hydroxyl groups present in the first base member 21 are bonded together.

As a result, the silicone compounds can be bonded to the bonding surface 23 not only through physical bonds but also through chemical bonds. This makes it possible for the bonding film 3 to be firmly bonded to the bonding surface 23 of the first base member 21.

Further, the silicone material is a material having relatively high flexibility. Therefore, even if the constituent material of the first base member 21 is different from that of the second base member 22, when the bonded body 1 is obtained by bonding them together through the bonding film 3 in the subsequent step [5], the bonding film 3 can reliably reduce stress which would be generated between the first and second base members 21 and 22 due to thermal expansions thereof. As a result, it is possible to reliably prevent occurrence of peeling in the bonded body 1 finally obtained.

Since the silicone material also has excellent chemical resistance, it can be effectively used in bonding members, which are exposed to chemicals for a long period of time, together. Specifically, for example, the bonding film 3 can be used in manufacturing a liquid droplet ejection head of a commercial ink jet printer in which an organic ink being apt to erode a resin material is employed. This makes it possible to reliably improve durability of the liquid droplet ejection head.

In addition, since the silicone material has excellent heat resistance, it can also be effectively used in bonding members, which are exposed to a high temperature, together.

[3] Next, the liquid material 35 applied onto the bonding surface 23 of the first base member 21, that is, the liquid coating 30 selectively formed on the film formation region 41 of the bonding surface 23 thereof is dried, to thereby obtain a bonding film 3 having a predetermined pattern which is of a shape corresponding to that of the film formation region 41.

A drying temperature of the liquid coating 30 is preferably 25° C. or higher, and more preferably in the range of about 25 to 100° C. Further, a drying time of the liquid coating 30 is preferably in the range of about 0.5 to 48 hours, and more preferably in the range of about 15 to 30 hours.

By drying the liquid coating 30 under the above conditions, it is possible to reliably form a bonding film 3 capable of appropriately developing the bonding property when applying the energy in the following step [4].

Further, as described in the step [2], in the case where the silicone material composed of the silicone compounds each having the at least one silanol group is used, the hydroxyl groups included in the silanol groups of the silicone compounds are reliably bonded together.

In addition, such hydroxyl groups and the hydroxyl groups present in the first base member 21 are reliably bonded together. For these reasons, the thus formed bonding film 3 can have excellent film strength and be firmly bonded to the first base member 21.

An ambient pressure in drying the liquid coating 30 may be an atmospheric pressure, but is preferably a reduced pressure. Specifically, a degree of the reduced pressure is preferably in the range of about $133.3\times10^{-5}$ to $1,333$ Pa ($1\times10^{-5}$ to $10$ Torr), and more preferably in the range of about $133.3\times10^{-4}$ to $133.3$ Pa ($1\times10^{-4}$ to $1$ Torr).

This makes it possible to improve density of the bonding film 3, that is, the bonding film 3 can become dense. As a result, the bonding film 3 can have more excellent film strength.

In this way, by appropriately controlling the conditions in forming the bonding film 3, it is possible to form a bonding film 3 having a desired film strength and the like.

An average thickness of the bonding film 3 is preferably in the range of about 10 to 10,000 nm, and more preferably in the range of about 50 to 5,000 nm. By setting the average thickness of the formed bonding film 3 to the above range, it is possible to prevent dimensional accuracy of the bonded body 1 obtained by bonding the first base member 21 and the second base member 22 together from being significantly lowered, thereby enabling to firmly bond them together.

In this regard, setting of the average thickness of the bonding film 3 can be performed by appropriately controlling an amount of the liquid material to be applied onto the first base member 21.

In other words, if the average thickness of the bonding film 3 is lower than the above lower limit value, there is a case that the bonded body 1 having sufficient bonding strength between the first base member 21 and the second base member 22 cannot be obtained. In contrast, if the average thickness of the bonding film 3 exceeds the above upper limit value, there is a fear that dimensional accuracy of the bonded body 1 is lowered significantly.

Moreover, by setting the average thickness of the bonding film 3 to the above range, the bonding film 3 can have a certain degree of elasticity. Therefore, when the first base member 21 and the second base member 22 are bonded together, even if particles or the like adhere (exist) on the bonding surface 24 of the second base member 22 which makes contact with the bonding film 3, the bonding film 3 can be bonded to the bonding surface 24 so as to take in the particles.

As a result, it is possible to reliably suppress or prevent reduction of the bonding strength between the bonding film 3 and the bonding surface 24 and occurrence of peeling of the bonding film 3 from the bonding surface 24 in an interface thereof, due to the existence of the particles.

Further, in the present invention, the bonding film 3 is formed by applying the liquid material 35 onto the bonding surface 23 of the first base member 21. Therefore, even if irregularities exist on the bonding surface 23, the bonding film 3 can be formed so as to assimilate the irregularities of the bonding surface 23, though it may be affected depending on sizes (heights) thereof. As a result, a surface 32 of the bonding film 3 can be composed from a substantially flat surface.

[4] Nest, the energy is applied on the surface 32 of the bonding film 3 formed on the film formation region 41 of the bonding surface 23 of the first base member 21.

When the energy is applied to the bonding film 3, a part of molecular bonds of the silicone compounds present in the vicinity of the surface 32 of the bonding film 3 are broken. As a result, the surface 32 is activated due to breakage of the molecular bonds. Namely, the bonding property with respect to the second base member 22 is developed in the vicinity of the surface 32 of the bonding film 3.

The first base member 21 having the bonding film 3 in such a state can be firmly bonded to the second base member 22 based on chemical bonds.

Here, in this specification, a state that the surface 32 of the bonding film 3 is "activated" means: a state that a part of the molecular bonds of the silicone compounds present in the vicinity of the surface 32 are broken as described above, e.g., a part of the methyl groups are broken and removed from the polydimethylsiloxane chemical structure, and a part of the silicon atoms are not terminated so that "dangling bonds (or uncoupled bonds)" are generated on the surface 32; a state that the silicon atoms having the dangling bonds (the unpaired electrons) are terminated by hydroxyl groups (OH groups) and the hydroxyl groups exist on the surface 32; and a state that the dangling bonds and the hydroxyl groups coexist on the surface 32.

The energy may be applied to the bonding film 3 by any method. Examples of the method include: a method in which an energy beam is irradiated on the bonding film 3; a method in which the bonding film 3 is heated; a method in which a compressive force (physical energy) is applied to the bonding film 3; a method in which the bonding film 3 is exposed to plasma (that is, plasma energy is applied to the bonding film 3); a method in which the bonding film 3 is exposed to an ozone gas (that is, chemical energy is applied to the bonding film 3); and the like.

This makes it possible to effectively activate the surface 32 of the bonding film 3. This also makes it possible to prevent excessive breakage of the molecular bonds of the silicone compounds contained in the bonding film 3. Therefore, it is possible to prevent a property of the bonding film 3 from being lowered.

Among the above methods, in this embodiment, it is particularly preferred that the method in which the energy beam is irradiated on the bonding film 3 is used as the method in which the energy is applied to the bonding film 3. Since such a method can efficiently apply the energy to the bonding film 3 relatively easily, the method is suitably used as the method of applying the energy.

Examples of the energy beam include: a ray such as an ultraviolet ray or a laser beam; an electromagnetic wave such as a X ray or a γ ray; a particle beam such as an electron beam or an ion beam; and combinations of two or more kinds of these energy beams.

Figure 3D:
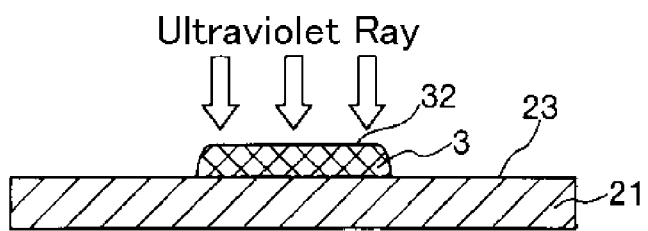

Among these energy beams, it is particularly preferred that an ultraviolet ray having a wavelength of about 126 to 300 nm is used (see FIG. 3D). Use of the ultraviolet ray having such a wavelength makes it possible to optimize an amount of the energy to be applied to the bonding film 3.

As a result, it is possible to prevent excessive breakage of the molecular bonds of the silicone compounds contained in the bonding film 3 as the major component thereof, and to selectively break the molecular bonds of the silicone compounds present in the vicinity of the surface 32 of the bonding film 3. This makes it possible for the bonding film 3 to develop the bonding property, while preventing a property thereof such as a mechanical property or a chemical property from being lowered.

Further, the use of the ultraviolet ray makes it possible to process a wide area of the surface 32 of the bonding film 3 without unevenness in a short period of time. Therefore, the breakage of the molecular bonds of the silicone compounds composing the silicone material contained in the bonding film 3 can be efficiently performed. Moreover, such an ultraviolet ray has, for example, an advantage that it can be generated by simple equipment such as an UV lamp.

In the case where the ultraviolet ray is used as the energy beams, since the liquid droplet ejection apparatus 500 is provided with the UV lamp 550, the steps [2] to [4] can be performed using the liquid droplet ejection apparatus 500.

In this regard, it is to be noted that the wavelength of the ultraviolet ray is more preferably in the range of about 126 to 200 nm.

In the case where the UV lamp 550 is used, power of the UV lamp 550 is preferably in the range about of 1 mW/cm$^2$ to 1 W/cm$^2$, and more preferably in the range of about 5 to 50 mW/cm$^2$, although being different depending on an area of the surface 32 of the bonding film 3. In this case, a distance between the UV lamp 550 and the bonding film 3 is preferably in the range of about 3 to 3,000 mm, and more preferably in the range of about 10 to 1,000 mm.

Further, a time for irradiating the ultraviolet ray is preferably set to a time enough for selectively breaking the molecular bonds of the silicone compounds present in the vicinity of the surface 32 of the bonding film 3.

Specifically, the time is preferably in the range of about 1 second to 30 minutes, and more preferably in the range of about 1 second to 10 minutes, although being slightly different depending on an amount of the ultraviolet ray, the constituent material of the bonding film 3, and the like.

The ultraviolet ray may be irradiated temporally continuously or intermittently (in a pulse-like manner).

On the other hand, examples of the laser beam include: a pulse oscillation laser (a pulse laser) such as an excimer laser; a continuous oscillation laser such as a carbon dioxide laser or a semiconductor laser; and the like. Among these lasers, it is preferred that the pulse laser is used.

Use of the pulse laser makes it difficult to accumulate of heat in a portion of the bonding film 3 where the laser beam is irradiated with time. Therefore, it is possible to reliably prevent alteration and deterioration of the bonding film 3 due to the heat accumulated. Namely, according to the use of the pulse laser, it is possible to prevent affection of the heat accumulated inside the bonding film 3.

In the case where influence of the heat is taken into account, it is preferred that a pulse width of the pulse laser is as small as possible. Specifically, the pulse width is preferably equal to or smaller than 1 ps (picosecond), and more preferably equal to or smaller than 500 fs (femtoseconds).

By setting the pulse width to the above range, it is possible to reliably suppress the influence of the heat generated in the bonding film 3 due to the irradiation with the laser beam. In this regard, it is to be noted that the pulse laser having the small pulse width of the above range is called "femtosecond laser".

A wavelength of the laser beam is not particularly limited to a specific value, but is preferably in the range of about 200 to 1,200 nm, and more preferably in the range of about 400 to 1,000 nm. Further, in the case of the pulse laser, peak power of the laser beam is preferably in the range of about 0.1 to 10 W, and more preferably in the range of about 1 to 5 W, although being different depending on the pulse width thereof.

Moreover, a repetitive frequency of the pulse laser is preferably in the range of about 0.1 to 100 kHz, and more preferably in the range of about 1 to 10 kHz. By setting the frequency of the pulse laser to the above range, the molecular bonds of the silicone compounds present in the vicinity of the surface 32 can be selectively broken.

By appropriately setting various conditions for such a laser beam, the temperature in the portion where the laser beam is irradiated is adjusted so as to be preferably in the range of about normal temperature (room temperature) to 600° C., more preferably about in the range of 200 to 600° C., and even more preferably in the range of about 300 to 400° C. The adjustment of the temperature in the region to the above range makes it possible to selectively break the molecular bonds of the silicone compounds present in the vicinity of the surface 32 of the bonding film 3.

The laser beam irradiated on the bonding film 3 is preferably scanned along the surface 32 of the bonding film 3 with a focus thereof set on the surface 32. By doing so, heat generated by the irradiation of the laser beam is locally accumulated in the vicinity of the surface 32. As a result, it is possible to selectively break the molecular bonds of the silicone compounds present in the vicinity of the surface 32 of the bonding film 3.

Further, the irradiation of the energy beam on the bonding film 3 may be performed in any ambient atmosphere. Specifically, examples of the ambient atmosphere include: an oxidizing gas atmosphere such as air or an oxygen gas; a reducing gas atmosphere such as a hydrogen gas; an inert gas atmosphere such as a nitrogen gas or an argon gas; a decompressed (vacuum) atmospheres obtained by decompressing any one of these ambient atmospheres; and the like.

Among these ambient atmospheres, the irradiation is particularly preferably performed in the air atmosphere (particularly, an atmosphere having a low dew point). By doing so, it is possible to generate an ozone gas near the surface 32. This makes it possible to more smoothly activate the surface 32. Further, by doing so, it becomes unnecessary to spend a labor hour and a cost for controlling the ambient atmosphere. This makes it possible to easily perform (carry out) the irradiation of the energy beam.

In this way, according to the method of irradiating the energy beam, the energy can be easily applied to the bonding film 3 selectively. Therefore, it is possible to prevent, for example, alteration and deterioration of the first base member 21 due to the application of the energy.

Further, according to the method of irradiating the energy beam, magnitude of the energy to be applied can be accurately and easily controlled. Therefore, it is possible to adjust the number of the molecular bonds to be broken within the bonding film 3. By adjusting the number of the molecular bonds to be broken in this way, it is possible to easily control the bonding strength between the first base member 21 and the second base member 22.

In other words, by increasing the number of the molecular bonds to be broken in the vicinity of the surface 32 of the bonding film 3, since a large number of active hands are generated in the vicinity of the surface 32, it is possible to further improve the bonding property developed in the bonding film 3.

On the other hand, by reducing the number of the molecular bonds to be broken in the vicinity of the surface 32 of the bonding film 3, it is possible to reduce the number of the active hands generated in the vicinity of the surface 32, thereby suppressing the bonding property developed in the bonding film 3.

In order to adjust the magnitude of the applied energy, for example, conditions such as a kind of the energy beam, power of the energy beam, and an irradiation time of the energy beam only have to be controlled.

Further, according to the method of irradiating the energy beam, a large amount of the energy can be applied to the bonding film 3 for a short period of time. This makes it possible to more effectively perform the application of the energy.

Figure 4E:
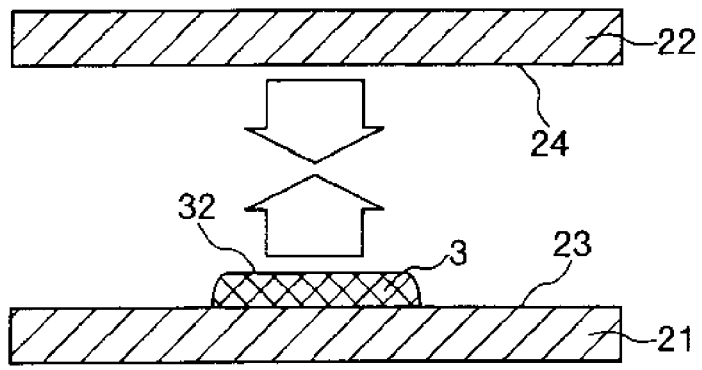

[5] Next, the first base member 21 and the second base member 22 are laminated together so that the bonding film 3 and the second base member 22 make close contact with each other (see FIG. 4E). At this time, since the surface 32 of the bonding film 3 has developed the bonding property with respect to the second base member 22 in the step [4], the bonding film 3 and the bonding surface 24 of the second base member 22 are chemically bonded together.

Figure 4F:
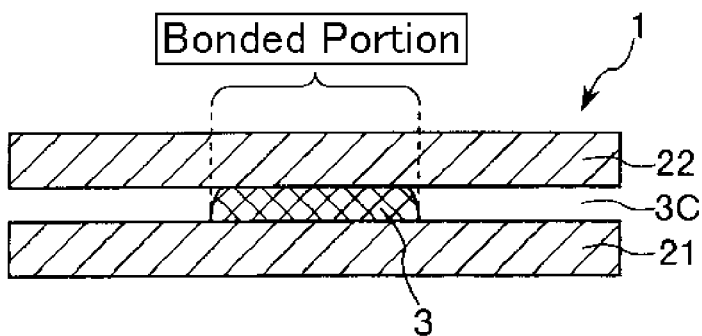

As a result, the first base member 21 and the second base member 22 are bonded together through the bonding film 3 electively formed on the film formation region 41, to thereby obtain a bonded body 1 shown in FIG. 4F.

In the bonded body 1 obtained in this way, the two base members 21 and 22 are bonded together by firm chemical bonds formed in a short period of time such as a covalent bond, unlike bond (adhesion) mainly based on a physical bond such as an anchor effect by using the conventional adhesive. Therefore, it is possible to obtain a bonded body 1 in a short period of time, and to prevent occurrence of peeling, bonding unevenness and the like in the bonded body 1.

Further, according to such a bonding method, a heat treatment at a high temperature (e.g., a temperature equal to or higher than 700° C.) is unnecessary unlike the conventional solid bonding method. Therefore, the first base member 21 and the second base member 22 each formed of a material having low heat resistance can also be used for bonding them.

In addition, the first base member 21 and the second base member 22 are bonded together through the bonding film 3. Therefore, there is also an advantage that each of the constituent materials of the base members 21 and 22 is not limited to a specific kind. For these reasons, it is possible to expand selections of the constituent materials of the first base member 21 and the second base member 22.

Further, in the case where the first base member 21 and the second base member 22 have the different thermal expansion coefficients with each other, it is preferred that the first base member 21 and the second base member 22 are bonded together at as low temperature as possible. If they are bonded together at the low temperature, it is possible to further reduce thermal stress which would be generated on the bonding interface therebetween.

Specifically, the first base member 21 and the second base member 22 are bonded together in a state that each of the first base member 21 and the second base member 22 is heated preferably at a temperature of about 25 to 50° C., and more preferably at a temperature of about 25 to 40° C., although being different depending on the difference between the thermal expansion coefficients thereof.

In such a temperature range, even if the difference between the thermal expansion coefficients of the first base member 21 and the second base member 22 is rather large, it is possible to sufficiently reduce thermal stress which would be generated on the bonding interface between the first base member 21 and the second base member 22. As a result, it is possible to reliably suppress or prevent occurrence of warp, peeling or the like in the bonded body 1.

Especially, in the case where the difference between the thermal expansion coefficients of the first base member 21 and the second base member 22 is equal to or larger than $5\times10^{-5}$/K, it is particularly recommended that the first base member 21 and the second base member 22 are bonded together at a low temperature as much as possible as described above.

According to this embodiment, when the first base member 21 and the second base member 22 are not bonded together in the entire of the interface therebetween, but partially bonded together through the bonding film 3 selectively formed on the film formation region 41. When bonding the base member 21 and 22 together, it is possible to easily select a bonded region thereof by merely controlling a size of the film formation region 41 on which the bonding film 3 is to be formed.

Therefore, by controlling, e.g., an area and/or a shape of the bonding film 3 through which the first base member 21 and the second base member 22 are bonded together, it is possible to easily adjust the bonding strength therebetween. As a result, there is provided a bonded body 1 that allows the bonding film 3 to be separated easily.

Namely, it is possible to adjust the bonding strength between the first base member 21 and the second base member 22 and separating strength (splitting strength) therebetween. From this standpoint, it is preferred that, in the case of producing an easy-to-separate bonded body 1, the bonding strength between the first base member 21 and the second base member 22 is set enough for the human hands to separate the bonded body 1. By doing so, it becomes possible to easily separate the bonded body 1 without having to use any device or tool.

By appropriately setting an area and/or a shape of the bonding film 3 through which the first base member 21 and the second base member 22 are bonded together, it is possible to reduce local concentration of stress which would be generated in the bonding film 3. This makes it possible to reliably bond the first base member 21 and the second base member 22 together, even if the difference between, for example, the thermal expansion coefficients thereof is large.

In addition, according to the bonding method of this embodiment, as shown in FIG. 4F, between the first base member 21 and the second base member 22 in the non-film formation region 42, a gap 3c having a distance (a size) corresponding to the thickness of the bonding film 3 is formed. This means that it is possible to easily form closed spaces, flow paths or the like each having a desired shape between the first base member 21 and the second base member 22 by suitably controlling the shape of the bonding film 3, in order to effectively utilize the gap 3c.

In this embodiment, as described in the above step [4] and this step [5], after the energy has been applied to the bonding film 3 to develop the bonding property in the vicinity of the surface 32 of the bonding film 3, the first base member 21 and the second base member 22 are laminated and bonded together through the bonding film 3.

However, the bonded body 1 may be obtained by laminating the first base member 21 and the second base member 22 together through the bonding film 3, and then applying the energy to the bonding film 3. Namely, the bonded body 1 may be obtained by reversing the order of the above step [4] and this step [5]. Even if these steps [4] and [5] are performed in such an order, the same effects as described above can be obtained.

In this case, the applying the energy to the bonding film 3 may be performed by a method in which the bonding film 3 is heated or a method in which the compressive force is applied to the bonding film 3, in addition to the above mentioned method in which the energy beam is irradiated on the bonding film 3. In this regard, one or more of which may be used independently or in combination. These methods are preferably used because they are capable of relatively easily and efficiently applying the energy to the bonding film 3.

In the case where the energy is applied to the bonding film 3 by heating the bonding film 3, a heating temperature is preferably in the range of about 25 to 100° C., and more preferably in the range of about 50 to 100° C. If the bonding film 3 is heated at a temperature of the above range, it is possible to reliably activate the bonding film 3 while reliably preventing the first base member 21 and the second base member 22 from being thermally altered or deteriorated.

Further, a heating time is set great enough to break the molecular bonds of the silicone compounds present in the vicinity of the surface 32 of the bonding film 3. Specifically, the heating temperature may be preferably in the range of about 1 to 30 minutes if the heating temperature is set to the above mentioned range. Furthermore, the bonding film 3 may be heated by any method. Examples of the heating method include various kinds of methods such as a method of using a heater, a method of irradiating an infrared ray and a method of making contact with a flame.

In the case of using the method of irradiating the infrared ray, it is preferred that the first base member 21 or the second base member 22 is made of a light-absorbing material. This ensures that the first base member 21 or the second base member 22 can generate heat efficiently when the infrared ray is irradiated thereon. As a result, it is possible to efficiently heat the bonding film 3.

Further, in the case of using the method of using the heater or the method of making contact with the flame, it is preferred that, between the first base member 21 and the second base member 22, the base member with which the heater or the flame makes contact is made of a material that exhibits superior thermal conductivity. This makes it possible to efficiently transfer the heat to the bonding film 3 through the first base member 21 or the second base member 22, thereby efficiently heating the bonding film 3.

Furthermore, in the case where the energy is applied to the bonding film 3 by imparting the compressive force to the bonding film 3, it is preferred that the first base member 21 and the second base member 22 are compressed against each other. Specifically, a pressure in compressing them is preferably in the range of about 0.2 to 10 MPa, and more preferably in the range of about 1 to 5 MPa.

This makes it possible to easily apply appropriate energy to the bonding film 3 by merely performing a compressing operation, which ensures that a sufficiently high bonding property with respect to the second base member 22 is developed in the bonding film 3. Although the pressure may exceed the above upper limit value, it is likely that damages and the like occur in the first base member 21 and the second base member 22, depending on the constituent materials thereof.

Further, a compressing time is not particularly limited to a specific value, but is preferably in the range of about 10 seconds to 30 minutes. In this regard, it is to be noted that the compressing time can be suitably changed, depending on magnitude of the compressive force. Specifically, the compressing time can be shortened as the compressive force becomes greater.

Here, description will be made on a mechanism that the first base member 21 and the second base member 22 are bonded together in this process. Hereinafter, description will be representatively offered regarding a case that the hydroxyl groups are exposed in the surface 24 of the second base member 22.

In this process, when the first base member 21 and the second base member 22 are laminated together so that the bonding film 3 formed on the first base member 21 makes contact with the bonding surface 24 of the second base member 22, the hydroxyl groups existing on the surface 32 of the bonding film 3 and the hydroxyl groups existing on the bonding surface 24 of the second base member 22 are attracted together, as a result of which hydrogen bonds are generated between the above adjacent hydroxyl groups. It is conceived that the generation of the hydrogen bonds makes it possible to bond the first base member 21 and the second base member 22 together.

Depending on conditions such as a temperature and the like, the hydroxyl groups bonded together through the hydrogen bonds are dehydrated and condensed, so that the hydroxyl groups and/or water molecules are removed from a bonding interface between the bonding film 3 and the second base member 22. As a result, two atoms, to which the hydroxyl group had been bonded, are bonded together directly or via an oxygen atom. In this way, it is conceived that the first base member 21 and the second base member 22 are firmly bonded together.

In addition, in the case where the dangling bonds (the uncoupled bonds) exist on the surface 32 of the bonding film 3 and/or in the bonding film 3 or on the surface 24 of the second base member 22 and/or in the second base member 22, when the first base member 21 and the second base member 22 are laminated together, the dangling bonds are bonded together.

This bonding occurs in a complicated fashion so that the dangling bonds are inter-linked. As a result, network-like bonds are formed in the bonding interface. This makes it possible to particularly firmly bond the bonding film 3 and the second base member 22 together.

In this regard, an activated state that the surface 32 of the bonding film 3 is activated in the step [4] is reduced with time. Therefore, it is preferred that this step [5] is started as early as possible after the step [4]. Specifically, this step [5] is preferably started within 60 minutes, and more preferably started within 5 minutes after the step [4].

If the step [5] is started within such a time, since the surface 32 of the bonding film 3 maintains a sufficient activated state, when the first base member 21 is bonded to the second base member 22 through the bonding film 3, they can be bonded together with sufficient high bonding strength therebetween.

In other words, the bonding film 3 before being activated is a film containing the silicone material as the major component thereof, and therefore it has relatively high chemical stability and excellent weather resistance. For this reason, the bonding film 3 before being activated can be stably stored for a long period of time. Therefore, a first base member 21 having such a bonding film 3 may be used as follows.

Namely, first, a large number of the first base members 21 each having such a bonding film 3 have been manufactured or purchased, and stored in advance. Then just before each of the first base members 21 is laminated to the second base member 22 through the bonding film 3 in this step, the energy is applied to only a necessary number of the first base members 21 each having such a bonding film 3 as described in the step [4]. This use is preferable because the bonded bodies 1 are manufactured effectively.

In the manner described above, it is possible to obtain a bonded body 1 (the bonded body) shown in FIG. 4F.

In the bonded body 1 obtained in this way, the bonding strength between the first base member 21 and the second base member 22 is preferably equal to or larger than 5 MPa (50 kgf/cm$^2$), and more preferably equal to or larger than 10 MPa (100 kgf/cm$^2$). Therefore, peeling of the bonded body 1 having such bonding strength therebetween can be sufficiently prevented.

Further, use of the bonding method of the present invention makes it possible to efficiently manufacture the bonded body 1 in which the first base member 21 and the second base member 22 are bonded together by the above large bonding strength therebetween.

Just when the bonded body 1 is obtained or after the bonded body 1 has been obtained, if necessary, at least one step (step of improving bonding strength between the first base member 21 and the second base member 22) among three steps (steps [6A], [6B] and [6C]) described below may be applied to the bonded body 1. This makes it possible to further improve the bonding strength between the first base member 21 and the second base member 22 with ease.

Figure 4G:
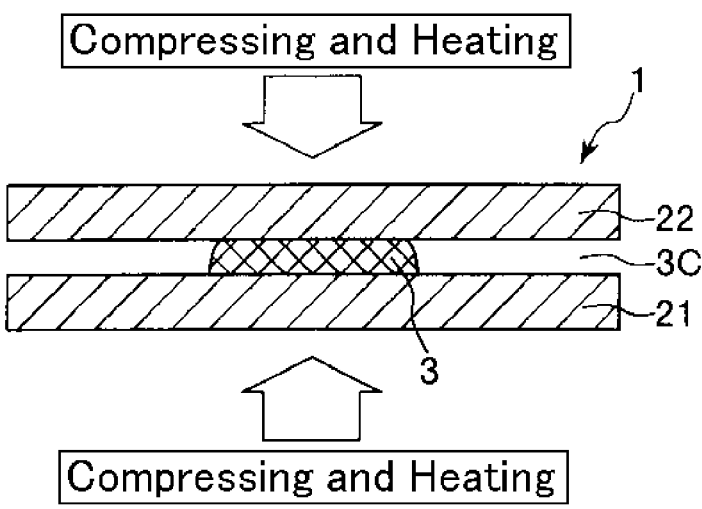

[6A] In this step, as shown in FIG. 4G, the obtained bonded body 1 is compressed in a direction in which the first base member 21 and the second base member 22 come close to each other.

As a result, surfaces of the bonding film 3 come closer to the bonding surface 23 of the first base member 21 and the bonding surface 24 of the second base member 22. It is possible to further improve the bonding strength between the members in the bonded body 1 (e.g., between the first base member 21 and the bonding film 3 and between the bonding film 3 and the second base member 22).

Further, by compressing the bonded body 1, spaces remaining in each of the boding interfaces (the contact interfaces) in the bonded body 1 can be crashed to further increase a bonding area (a contact area) thereof. This makes it possible to further improve the bonding strength between the members in the bonded body 1.

In this regard, it is to be noted that a pressure in compressing the bonded body 1 can be appropriately adjusted, depending on the constituent materials and thicknesses of the first base member 21 and the second base member 22, conditions of a bonding apparatus, and the like.

Specifically, the pressure is preferably in the range of about 0.2 to 10 MPa, and more preferably in the range of about 1 to 5 MPa, although being slightly different depending on the constituent materials and thicknesses of the first base member 21 and the second base member 22, and the like.

By setting the pressure to the above range, it is possible to reliably improve the bonding strength between the members in the bonded body 5. Further, although the pressure may exceed the above upper limit value, there is a fear that damages and the like occur in the first base member 21 and the second base member 22, depending on the constituent materials thereof.

A time for compressing the bonded body 1 is not particularly limited to a specific value, but is preferably in the range of about 10 seconds to 30 minutes. The compressing time can be appropriately changed, depending on the pressure in compressing the bonded body 1. Specifically, in the case where the pressure in compressing the bonded body 1 is higher, it is possible to improve the bonding strength between the members in the bonded body 5 even if the compressing time becomes short.

[6B] In this step, as shown in FIG. 4G, the obtained bonded body 1 is heated.

This makes it possible to further improve the bonding strength between the members in the bonded body 1. A temperature in heating the bonded body 1 is not particularly limited to a specific value, as long as the temperature is higher than room temperature and lower than a heat resistant temperature of the bonded body 1.

Specifically, the temperature is preferably in the range of about 25 to 100° C., and more preferably in the range of about 50 to 100° C. If the bonded body 1 is heated at the temperature of the above range, it is possible to reliably improve the bonding strength between the members in the bonded body 1 while reliably preventing them from being thermally altered and deteriorated.

Further, a heating time is not particularly limited to a specific value, but is preferably in the range of about 1 to 30 minutes.

In the case where both steps [6A] and [6B] are performed, the steps are preferably performed simultaneously. In other words, as shown in FIG. 4G, the bonded body 1 is preferably heated while being compressed. By doing so, an effect by compressing and an effect by heating are exhibited synergistically. It is possible to particularly improve the bonding strength between the members in the bonded body 1.

[6C] In this step, an ultraviolet ray is irradiated on the obtained bonded body 1.

This makes it possible to increase the number of chemical bonds formed between the bonding film 3 and the second base member 22 in the bonded body 1. As a result, it is possible to particularly improve the bonding strength therebetween. Conditions of the ultraviolet ray irradiated at this time can be the same as those of the ultraviolet ray irradiated in the step [4] described above.

Further, in the case where this step [6C] is performed, one of the first base member 21 and the second base member 22 needs to have translucency. It is possible to reliably irradiate the ultraviolet ray on the bonding film 3 by irradiating it from the side of the base member having the translucency.

Through the steps described above, it is possible to easily improve the bonding strength between the members in the bonded body 1 (especially, between the bonding film 3 and the second base member 22), and, eventually, to further improve the bonding strength between the first base member 21 and the second base member 22.

Second Embodiment

Next, description will be made on a second embodiment of the bonding method according to the present invention.

Figure 5A:
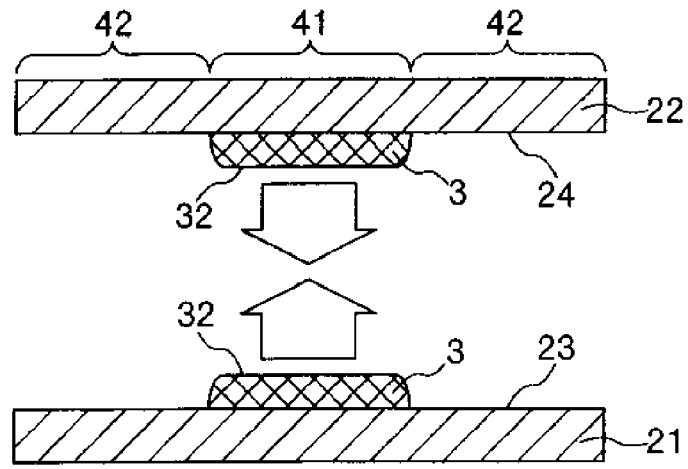
FIGS. 5A to 5C are sectional views for explaining a second embodiment of the bonding method according to the present invention.
Figure 5B:
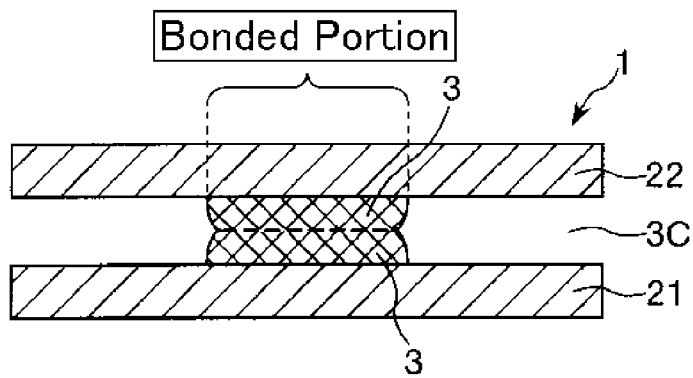
Figure 5C:
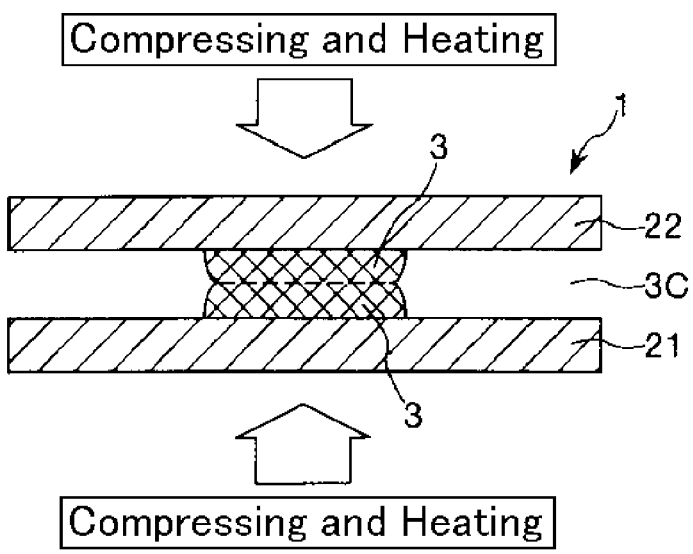

FIGS. 5A to 5C are sectional views for explaining the second embodiment of the bonding method according to the present invention. In this regard, it is to be noted that in the following description, an upper side in each of FIGS. 5A to 5C will be referred to as "upper" and a lower side thereof will be referred to as "lower".

Hereinafter, the second embodiment of the bonding method will be described by placing emphasis on the points differing from the first embodiment of the bonding method, with the same matters omitted from description.

The bonding method according to this embodiment is the same as that of the first embodiment, except that the bonding film 3 is also formed on the film-formation region 41 of the bonding surface 24 of the second base member 22.

Specifically, in the second embodiment, the bonding film 3 is formed on the film formation region 41 of the bonding surface 23 of the first base member 21, the bonding film 3 is also formed on a film formation region 41 of the bonding surface 24 of the second base member 22, the bonding property is developed in the vicinity of the surface 32 of each of the bonding films 3 formed on the base members 21 and 22, and then the bonding films 3 make contact with each other so that the first base member 21 and the second base member 22 are bonded together through the bonding films 3, to thereby obtain a bonded body 1.

In other wards, the bonding method of the present embodiment is a method in which the bonding films 3 each having the predetermined pattern are formed on both the first base member 21 and the second base member 22, and then the first base member 21 and the second base member 22 are bonded together by unifying the bonding films 3.

[1'] First, prepared are the same first base member 21 and second base member 22 as described in the step [1].

[2'] Next, the bonding film 3 is formed on the film formation region 41 of the bonding surface 23 of the first base member 21 and the bonding film 3 is also formed on the film formation region 41 of the bonding surface 24 of the second base member 22 in the same manner as in the steps [2] and [3] described above.

[3'] Next, the energy is applied to both the bonding film 3 formed on the first base member 21 and the bonding film 3 formed on the second base member 22 in the same manner as in the step [4] described above. In this way, the bonding property is developed in the vicinity of the surface 32 of each of the bonding films 3.

[4'] Then, as shown in FIG. 5A, the base members 21 and 22 are laminated together so that the bonding films 3 each having the bonding property thus developed make close contact with each other. In this step, the base members 21 and 22 are partially bonded together through the bonding films 3 selectively formed on both of the film formation regions 41 of the base members 21 and 22, to thereby obtain the bonded body 1 shown in FIG. 5B.

In this way, the bonded body 1 can be obtained.

If necessary, the bonded body 1 thus obtained may be subjected to at least one of the steps [6A], [6B] and [6C] each described in the first embodiment.

As shown in FIG. 5C, for example, if the bonded body 1 is heated while compressing the same, the base members 21 and 22 of the bonded body 1 come closer to each other. This accelerates the dehydration and condensation of the hydroxyl groups and/or the bonding of the dangling bonds in, specially, a bonding interface between the bonding films 3. Thus, unification (bonding) of the bonding films 3 is further progressed, whereby they are substantially completely united finally.

Liquid Droplet Ejection Head

Now, description will be made on an embodiment of a liquid droplet ejection head in which the bonded body according to the present invention is used.

Figure 6:
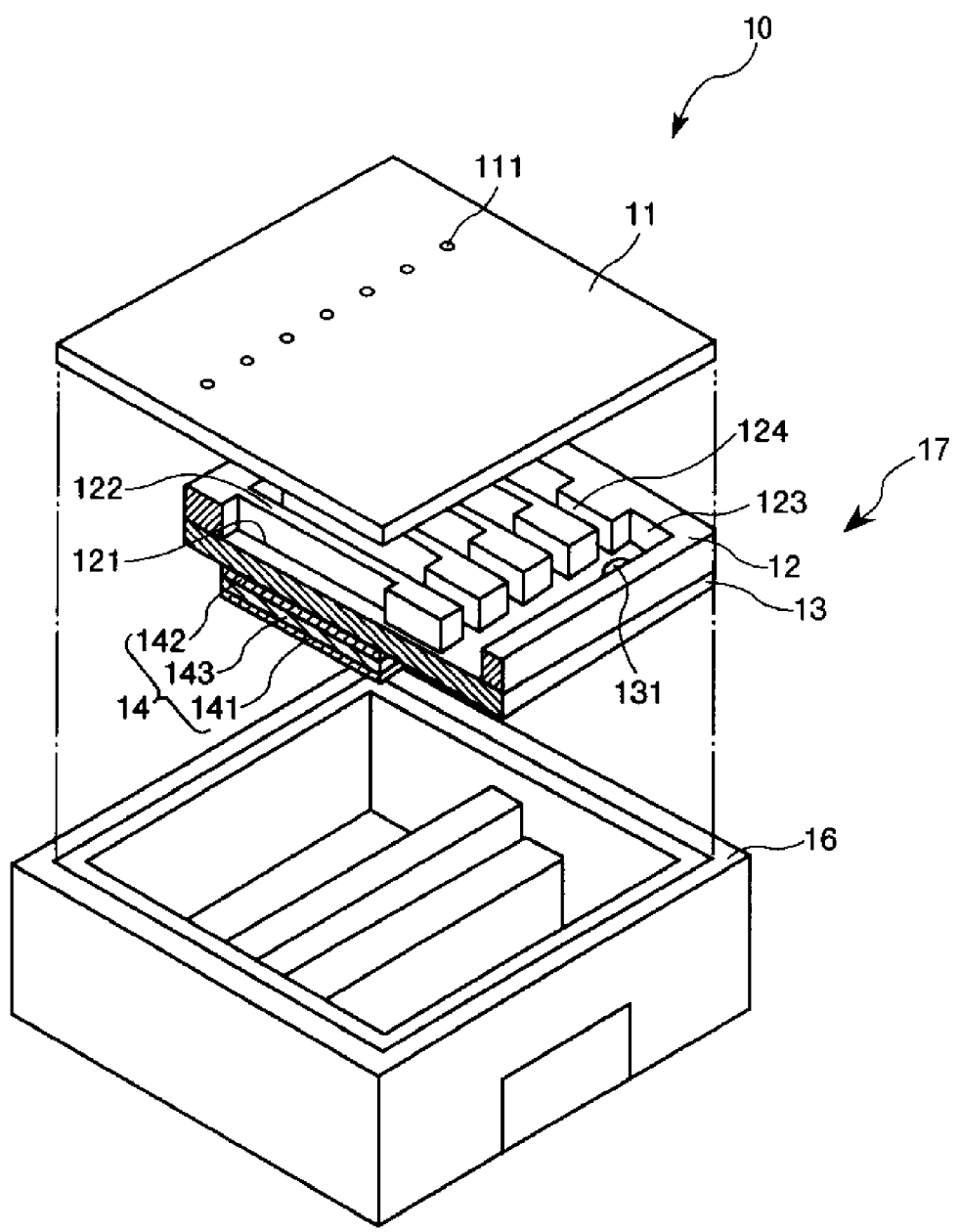
FIG. 6 is an exploded perspective view showing an ink jet type recording head (a liquid droplet ejection head) in which a bonded body according to the present invention is used.
Figure 7:
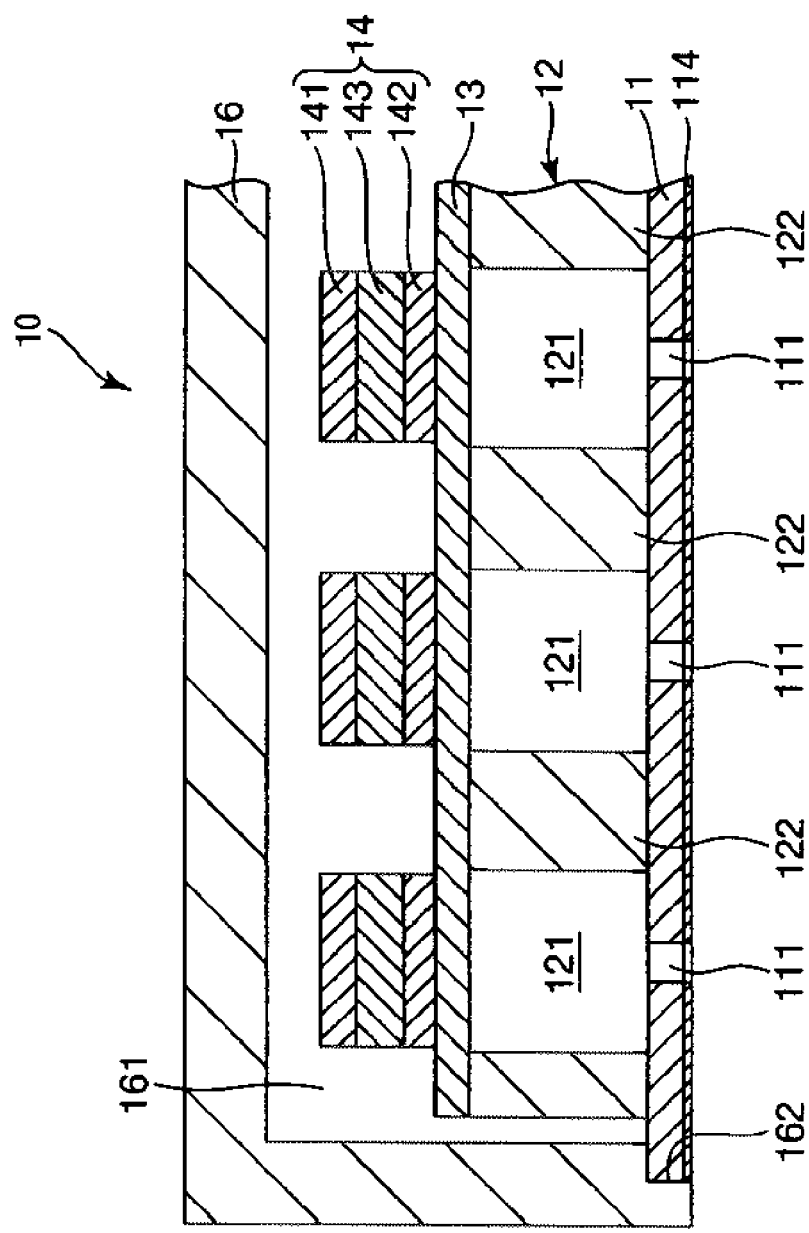
FIG. 7 is a section view illustrating a main portion of the ink jet type recording head shown in FIG. 6.
Figure 8:
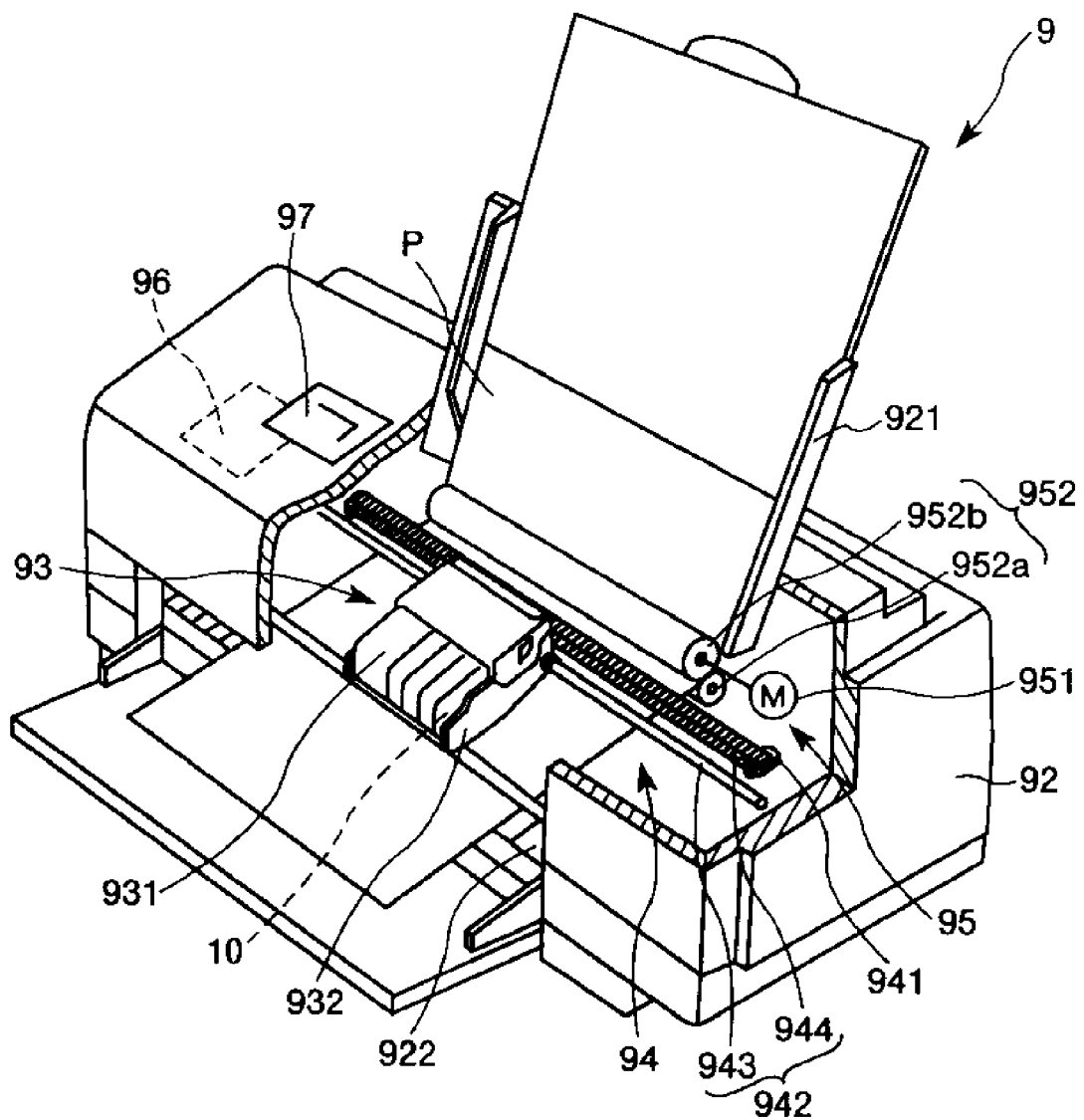
FIG. 8 is a schematic view showing one embodiment of an ink jet printer equipped with the ink jet type recording head shown in FIG. 6.

FIG. 6 is an exploded perspective view showing an ink jet type recording head (a liquid droplet ejection head) in which the bonded body according to the present invention is used. FIG. 7 is a section view illustrating a main portion of the ink jet type recording head shown in FIG. 6. FIG. 8 is a schematic view showing one embodiment of an ink jet printer equipped with the ink jet type recording head shown in FIG. 6. In FIG. 6, the ink jet type recording head is shown in an inverted state as distinguished from a typical use state.

The ink jet type recording head 10 shown in FIG. 6 is mounted to the ink jet printer 9 shown in FIG. 8.

The ink jet printer 9 shown in FIG. 8 includes a printer body 92, a tray 921 provided in an upper rear portion of the printer body 92 for holding recording paper sheets P, a paper discharging port 922 provided in a lower front portion of the printer body 92 for discharging the recording paper sheets P therethrough, and an operation panel 97 provided on an upper surface of the printer body 92.

The operation panel 97 is formed from, e.g., a liquid crystal display, an organic EL display, an LED lamp or the like. The operation panel 97 includes a display portion (not shown) for displaying an error message and the like and an operation portion (not shown) formed from various kinds of switches.

Within the printer body 92, there are provided a printing device (a printing means) 94 having a reciprocating head unit 93, a paper sheet feeding device (a paper sheet feeding means) 95 for feeding the recording paper sheets P into the printing device 94 one by one and a control unit (a control means) 96 for controlling the printing device 94 and the paper sheet feeding device 95.

Under control of the control unit 96, the paper sheet feeding device 95 feeds the recording paper sheets P one by one in an intermittent manner. The recording paper sheet P passes near a lower portion of the head unit 93. At this time, the head unit 93 makes reciprocating movement in a direction generally perpendicular to a feeding direction of the recording paper sheet P, thereby printing the recording paper sheet P.

In other words, an ink jet type printing operation is performed, during which time the reciprocating movement of the head unit 93 and the intermittent feeding of the recording paper sheets P act as primary scanning and secondary scanning, respectively.

The printing device 94 includes a head unit 93, a carriage motor 941 serving as a driving power source of the head unit 93 and a reciprocating mechanism 942 rotated by the carriage motor 941 for reciprocating the head unit 93.

The head unit 93 includes an ink jet type recording head 10 (hereinafter, simply referred to as "head 10") having a plurality of nozzle holes 111 formed in a lower portion thereof, an ink cartridge 931 for supplying an ink to the head 10 and a carriage 932 carrying the head 10 and the ink cartridge 931.

Full color printing becomes available by using, as the ink cartridge 931, a cartridge of the type filled with ink of four colors, i.e., yellow, cyan, magenta and black.

The reciprocating mechanism 942 includes a carriage guide shaft 943 whose opposite ends are supported on a frame (not shown) and a timing belt 944 extending parallel to the carriage guide shaft 943.

The carriage 932 is reciprocatingly supported by the carriage guide shaft 943 and fixedly secured to a portion of the timing belt 944.

If the timing belt 944 wound around a pulley is caused to run in forward and reverse directions by operating the carriage motor 941, the head unit 93 makes reciprocating movement along the carriage guide shaft 943. During this reciprocating movement, an appropriate amount of the ink is ejected from the head 10 to print the recording paper sheets P.

The paper sheet feeding device 95 includes a paper sheet feeding motor 951 serving as a driving power source thereof and a pair of paper sheet feeding rollers 952 rotated by means of the paper sheet feeding motor 951.

The paper sheet feeding rollers 952 include a driven roller 952a and a driving roller 952b, both of which face toward each other in a vertical direction, with a paper sheet feeding path (the recording paper sheet P) remained therebetween. The driving roller 952b is connected to the paper sheet feeding motor 951.

Thus, the paper sheet feeding rollers 952 are able to feed the plurality of the recording paper sheets P, which are held in the tray 921, toward the printing device 94 one by one. In place of the tray 921, it may be possible to employ a construction that can removably hold a paper sheet feeding cassette containing the recording paper sheets P.

The control unit 96 is designed to perform printing by controlling the printing device 94 and the paper sheet feeding device 95 based on printing data inputted from a host computer, e.g., a personal computer or a digital camera.

Although not shown in the drawings, the control unit 96 is mainly comprised of a memory that stores a control program for controlling the respective parts an d the like, a piezoelectric element driving circuit for driving piezoelectric elements (vibration sources) 14 to control an ink ejection timing, a driving circuit for driving the printing device 94 (the carriage motor 941), a driving circuit for driving the paper sheet feeding device 95 (the paper sheet feeding motor 951), a communication circuit for receiving the printing data from the host computer, and a CPU electrically connected to the memory and the circuits for performing various kinds of control with respect to the respective parts.

Electrically connected to the CPU are a variety of sensors capable of detecting, e.g., a remaining amount of the ink in the ink cartridge 931 and a position of the head unit 93.

The control unit 96 receives the printing data through the communication circuit and then stores them in the memory. The CPU processes these printing data and outputs driving signals to the respective driving circuits, based on the data thus processed and data inputted from the variety of sensors. Responsive to these signals, the piezoelectric elements 14, the printing device 94 and the paper sheet feeding device 95 come into operation, thereby printing the recording paper sheets P.

Hereinafter, the head 10 will be described in detail with reference to FIGS. 6 and 7.

The head 10 includes a head main body 17 and a base body 16 for receiving the head main body 17. The head main body 17 includes a nozzle plate 11, an ink chamber base plate 12, a vibration plate 13 and a plurality of piezoelectric elements (vibration sources) 14 bonded to the vibration plate 13. The head 10 constitutes a piezo jet type head of on-demand style.

The nozzle plate 11 is made of, e.g., a silicon-based material such as $SiO_2$, SiN or quartz glass, a metal-based material such as Al, Fe, Ni, Cu or alloy containing these metals, an oxide-based material such as alumina or ferric oxide, a carbon-based material such as carbon black or graphite, and the like.

The plurality of the nozzle holes 111 for ejecting ink droplets therethrough are formed in the nozzle plate 11. A pitch of the nozzle holes 111 is suitably set according to a degree of printing accuracy.

The ink chamber base plate 12 is fixed or secured to the nozzle plate 11. In the ink chamber base plate 12, there are formed a plurality of ink chambers (cavities or pressure chambers) 121, a reservoir chamber 123 for reserving the ink supplied from the ink cartridge 931 and a plurality of supply ports 124 through which the ink is supplied from the reservoir chamber 123 to the respective ink chambers 121. These chambers 121, 123 and 124 are defined by the nozzle plate 11, side walls (barrier walls) 122 and the below mentioned vibration plate 13.

The respective ink chambers 121 are formed into a reed shape (a rectangular shape) and are arranged in a corresponding relationship with the respective nozzle holes 111. Volume of each of the ink chambers 121 can be changed in response to vibration of the vibration plate 13 as described below. The ink is ejected from the ink chambers 121 by virtue of this volume change.

As a base material of which the ink chamber base plate 12 is made, it is possible to use, e.g., a monocrystalline silicon substrate, various kinds of glass substrates or various kinds of resin substrates. Since these substrates are all generally used in the art, use of these substrates makes it possible to reduce a manufacturing cost of the head 10.

The vibration plate 13 is bonded to an opposite side of the ink chamber base plate 12 from the nozzle plate 11. The plurality of the piezoelectric elements 14 are provided on an opposite side of the vibration plate 13 from the ink chamber base plate 12.

In a predetermined position of the vibration plate 13, a communication hole 131 is formed through a thickness of the vibration plate 13. The ink can be supplied from the ink cartridge 931 to the reservoir chamber 123 through the communication hole 131.

Each of the piezoelectric elements 14 includes an upper electrode 141, a lower electrode 142 and a piezoelectric body layer 143 interposed between the upper electrode 141 and the lower electrode 142. The piezoelectric elements 14 are arranged in alignment with generally central portions of the respective ink chambers 121.

The piezoelectric elements 14 are electrically connected to the piezoelectric element driving circuit and are designed to be operated (vibrated or deformed) in response to the signals supplied from the piezoelectric element driving circuit.

The piezoelectric elements 14 act as vibration sources. The vibration plate 13 is vibrated by operation of the piezoelectric elements 14 and has a function of instantaneously increasing internal pressures of the ink chambers 121.

The base body 16 is made of, e.g., various kinds of resin materials or various kinds of metallic materials. The nozzle plate 11 is fixed to and supported by the base body 16. Specifically, in a state that the head main body 17 is received in a recess portion 161 of the base body 16, an edge of the nozzle plate 11 is supported on a shoulder 162 of the base body 16 extending along an outer circumference of the recess portion 161.

When bonding the nozzle plate 11 and the ink chamber base plate 12, the ink chamber base plate 12 and the vibration plate 13, and the nozzle plate 11 and the base body 16 as mentioned above, the bonding method of the present invention is used in at least one bonded portion thereof.

In other words, the bonded body of the present invention is used in at least one of a bonded body in which the nozzle plate 11 and the ink chamber base plate 12 are bonded together, a bonded body in which the ink chamber base plate 12 and the vibration plate 13 are bonded together, and a bonded body in which the nozzle plate 11 and the base body 16 are bonded together.

In such a head 10, two members constituting each of them are bonded together through the bonding film 3 in the bonded portion. Therefore, the head 10 exhibits increased bonding strength and chemical resistance in bonding interfaces (the bonded portion), which in turn leads to increased durability and liquid tightness against the ink reserved in the respective ink chambers 121. As a result, the head 10 is rendered highly reliable.

Furthermore, highly reliable bonding is available even at an extremely low temperature. There is an advantage that a head with an increased area can be fabricated from members made of materials having different linear expansion coefficients.

Moreover, in the case where the bonded body of the present invention is used in a part of the head 10, it is possible to manufacture a head 10 having high dimensional accuracy. Therefore, it is possible to control an ejecting direction of ink droplets ejected from the head 10, and a distance between the head 10 and each of the recording paper sheets P with high accuracy. This makes it possible to improve a quality of a printing recorded using the ink jet printer 9 provided with such a head 10.

Further, according to the bonding method of the present invention, since the application of the liquid material 35 is performed using the liquid droplet ejecting method, a position of the application thereof is arbitrarily controlled. This makes it possible to adjust an area and/or an arrangement of the bonded portion (the bonding film 3) in each of the bonded bodies.

Therefore, it is possible to reduce local concentration of stress which would be generated in the bonding interfaces (the bonded portion) in each of the bonded bodies. As a result, the two members constituting each of them (e.g., the nozzle plate 11 and the ink chamber base plate 12, the ink chamber base plate 12 and the vibration plate 13, or the nozzle plate 11 and the base body 16) can be reliably bonded together through the bonding film 3 in the bonded portion, even if a difference between thermal expansion coefficients thereof is large.

In addition, by reducing the local concentration of the stress which would be generated in the bonding interfaces in each of the bonded bodies, it is possible to reliably prevent occurrence of peeling, warp or the like therein. This makes it possible to obtain a head 10 and an ink jet printer each having high reliability.

With the head 10 set forth above, no deformation occurs in the piezoelectric body layer 143, in the case where a predetermined ejection signal has not been inputted from the piezoelectric element driving circuit, that is, a voltage has not been applied between the upper electrode 141 and the lower electrode 142 of each of the piezoelectric elements 14.

For this reason, no deformation occurs in the vibration plate 13 and no change occurs in the volumes of the ink chambers 121. Therefore, the ink droplets have not been ejected from the nozzle holes 111.

On the other hand, the piezoelectric body layer 143 is deformed, in the case where the predetermined ejection signal is inputted from the piezoelectric element driving circuit, that is, the voltage is applied between the upper electrode 141 and the lower electrode 142 of each of the piezoelectric elements 14.

Thus, the vibration plate 13 is heavily deflected to change the volumes of the ink chambers 121. At this moment, pressures within the ink chambers 121 are instantaneously increased and the ink droplets are ejected from the nozzle holes 111.

when one ink ejection operation has ended, the piezoelectric element driving circuit ceases to apply the voltage between the upper electrode 141 and the lower electrode 142. Thus, the piezoelectric elements 14 are returned substantially to their original shapes, thereby increasing the volumes of the ink chambers 121.

At this time, a pressure acting from the ink cartridge 931 toward the nozzle holes 111 (a positive pressure) is imparted to the ink. This prevents an air from entering the ink chambers 121 through the nozzle holes 111, which ensures that the ink is supplied from the ink cartridge 931 (the reservoir chamber 123) to the ink chambers 121 in a quantity corresponding to the quantity of the ink ejected.

By sequentially inputting ejection signals from the piezoelectric element driving circuit to the piezoelectric elements 14 lying in target printing positions, it is possible to print an arbitrary (desired) letter, figure or the like.

The head 10 may be provided with thermoelectric conversion elements in place of the piezoelectric elements 14. In other words, the head 10 may have a configuration in which the ink is ejected using a thermal expansion of a material caused by the thermoelectric conversion elements (which is sometimes called a bubble jet method wherein the term "bubble jet" is a registered trademark).

In the head 10 configured as above, a film 114 is formed on the nozzle plate 11 in an effort to impart liquid repellency thereto. By doing so, it is possible to reliably prevent the ink droplets from adhering to peripheries of the nozzle holes 111, which would otherwise occur when the ink droplets are ejected from the nozzle holes 111.

As a result, it becomes possible to make sure that the ink droplets ejected from the nozzle holes 111 are reliably landed (hit) on target regions.

Although the bonding method and the bonded body according to the present invention has been described above based on the embodiments illustrated in the drawings, the present invention is not limited thereto. If necessary, one or more arbitrary step may be added in the bonding method according to the present invention.

It is needless to say that the bonded body according to the present invention can be used in other apparatuses than the liquid droplet ejection apparatus as described in the embodiment. Examples of the other apparatuses include a semiconductor apparatus, a MEMS, a microreactor and the like.

EXAMPLES

Next, description will be made on a number of concrete examples of the present invention.

Example 1

First, a monocrystalline silicon substrate having a length of 20 mm, a width of 20 mm and an average thickness of 1 mm was prepared as a first base member. A glass substrate having a length of 20 mm, a width of 20 mm and an average thickness of 1 mm was prepared as a second base member. Both the monocrystalline silicon substrate and the glass substrate were subjected to a surface treatment using oxygen plasma.

Next, a liquid material having a viscosity of 18.0 mPa·s at 25° C. ("KR-251" produced by Shin-Etsu Chemical Co., Ltd.) was prepared. In this regard, the liquid material contained a silicone material composed of silicone compounds each having a polydimethylsiloxane chemical structure, and toluene and isobutanol as a solvent.

Then, the liquid material was ejected in the form of liquid droplets each having a volume of 5 pL onto a surface of the monocrystalline silicon substrate using an ink jet method, to form a liquid coating. In this regard, the liquid coating had a shape of an alphabetical capital "E" with a width of about 60 µm in each part thereof.

Next, the liquid coating was dried at normal temperature (25° C.) for 24 hours, to thereby obtain a bonding film (an average thickness thereof: about 100 nm and a width in each part thereof: 60 µm) on the monocrystalline silicon substrate.

Then, an ultraviolet ray was irradiated on the bonding film formed on the monocrystalline silicon substrate under the following conditions.

Ultraviolet Ray Irradiation Conditions
Composition of atmospheric gas: air atmosphere
Temperature of atmospheric gas: 20° C.
Pressure of atmospheric gas: atmospheric pressure (100 kPa)
Wavelength of ultraviolet ray: 172 nm
Irradiation time of ultraviolet ray: 5 minutes Next, the monocrystalline silicon substrate and the glass substrate were laminated together so that the ultraviolet ray-irradiated surface of the bonding film and the surface-treated surface of the glass substrate made contact with each other.

Then, the monocrystalline silicon substrate and the glass substrate were heated at a temperature of 80° C. while compressing the same under a pressure of 3 MPa and were maintained for 15 minutes.

In this way, obtained was a bonded body (a laminated body) in which the monocrystalline silicon substrate and the glass substrate were bonded together through the bonding film having a pattern being of the shape of the alphabetical capital "E".

In this regard, bonding strength between the monocrystalline silicon substrate and the glass substrate was measured using a mechanical strength tester ("ROMULUS" produced by QUAD GROUP Inc.). As a result, the bonding strength was 10 MPa or more.

Example 2

A bonded body was manufactured in the same manner as in the Example 1, except that the first base member was changed to a stainless steel substrate from the monocrystalline silicon substrate, and the second base member was changed to a polyimide substrate from the glass substrate.

Like the Example 1, in this Example 2, the formed bonding film had a pattern being of a shape of an alphabetical capital "E" (an average thickness thereof: about 100 nm and a width in each part thereof: 60 µm). Further, bonding strength between the stainless steel substrate and the polyimide substrate was 10 MPa or more.

Example 3

A bonded body was manufactured in the same manner as in the Example 1, except that the bonding film was also formed on the glass substrate using the same method as employed in forming the bonding film on the monocrystalline silicon substrate, and the monocrystalline silicon substrate and the glass substrate were bonded together through the bonding films formed thereon.

Like the Example 1, in this Example 3, each of the formed bonding films had a pattern being of a shape of an alphabetical capital "E" (an average thickness thereof: about 100 nm and a width in each part thereof: 60 µm). Further, bonding strength between the monocrystalline silicon substrate and the glass substrate was 10 MPa or more.

Example 4

A bonded body was manufactured in the same manner as in the Example 1, except that a liquid material having a viscosity of 1.20 mpa·s at 25° C. ("KR-400" produced by Shin-Etsu Chemical Co., Ltd.) was used instead of the liquid material.

In this regard, the liquid material contained a silicone material composed of silicone compounds each having a polydimethylsiloxane chemical structure, and no solvent.

Like the Example 1, in this Example 4, the formed bonding film had a pattern being of a shape of an alphabetical capital "E" (an average thickness thereof: about 100 nm and a width in each part thereof: 60 µm). Further, bonding strength between the monocrystalline silicon substrate and the glass substrate was 10 MPa or more.

What is claimed is:

1. A bonding method of forming a bonded body in which a first base member and a second base member are bonded together through a bonding film having a predetermined pattern, the bonding method comprising:
    applying a liquid material containing a silicone material composed of silicone compounds onto a surface of at least one of the first and second base members using a liquid droplet ejecting method, to form a liquid coating having a pattern corresponding to the predetermined pattern on the surface;
    drying the liquid coating so that it is transformed into the bonding film having the predetermined pattern on the surface of the at least one of the first and second base members;
    first applying energy to the bonding film so that a bonding property is developed in the vicinity of a surface thereof, wherein the first applying energy includes irradiating an ultraviolet ray on the bonding film, heating the bonding film, and applying a compressive force to the bonding film;
    making the first and second base members contact with each other through the bonding film to obtain the bonded body; and
    second applying energy to the obtained bonded body, wherein the second applying energy includes irradiating an ultraviolet ray on the obtained bonded body, heating the obtained bonded body, and applying a compressive force to the obtained bonded body, and
    wherein a surface of each of the first and second base members which makes contact with the bonding film has been, in advance, subjected to a surface treatment for improving bonding strength between each of the first and second base members and the bonding film, and wherein the surface treatment is an ultraviolet ray irradiation treatment.

2. The bonding method as claimed in claim 1, wherein each of the silicone compounds has a polydimethylsiloxane chemical structure as a main chemical structure thereof.

3. The bonding method as claimed in claim 1, wherein each of the silicone compounds has at least one silanol group.

4. The bonding method as claimed in claim 1, wherein the liquid droplet ejecting method is an ink jet method by which the liquid material is ejected in the form of liquid droplets from a nozzle provided in an ink jet head by utilizing vibration of a piezoelectric element.

5. The bonding method as claimed in claim 1, wherein the predetermined pattern is of a shape corresponding to that of a region of the surface on which the bonding film is formed.

6. The bonding method as claimed in claim 1, wherein the first applying energy is performed by irradiating the ultraviolet ray on the bonding film, wherein the ultraviolet ray has a wavelength of 126 to 300 nm.

7. The bonding method as claimed in claim 1, wherein the first applying energy is performed by heating the bonding film, wherein a temperature of the heating is in the range of 25 to 100° C.

8. The bonding method as claimed in claim 1, wherein the first applying energy is performed by applying the compressive force to the bonding film, wherein the compressive force is in the range of 0.2 to 10 MPa.

9. The bonding method as claimed in claim 1, wherein the first applying energy is performed in an air atmosphere.

10. The bonding method as claimed in claim 1, wherein an average thickness of the bonding film is in the range of 10 to 10,000 nm.

11. The bonding method as claimed in claim 1, wherein at least a portion of each of the first and second base members which makes contact with the bonding film is composed of a silicon material, a metal material or a glass material as a major component thereof.

12. The bonding method as claimed in claim 1, wherein the heating the obtained bonded body and the applying the compressive force to the obtained bonded body are performed simultaneously.

13. The bonding method as claimed in claim 1, wherein the applying the liquid material is performed by applying the liquid material onto both surfaces of the first and second base members.

* * * * *